(12) United States Patent
Ikeda et al.

(10) Patent No.: US 8,930,173 B2
(45) Date of Patent: Jan. 6, 2015

(54) VEHICLE BEHAVIOR ESTIMATION DEVICE

(75) Inventors: Takuro Ikeda, Kawasaki (JP); Eiji Kitagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 13/158,630

(22) Filed: Jun. 13, 2011

(65) Prior Publication Data

US 2011/0313740 A1 Dec. 22, 2011

(30) Foreign Application Priority Data

Jun. 16, 2010 (JP) ................................ 2010-137333

(51) Int. Cl.
*G06G 7/48* (2006.01)
*G05B 17/02* (2006.01)
*G08G 1/01* (2006.01)

(52) U.S. Cl.
CPC . *G05B 17/02* (2013.01); *G08G 1/01* (2013.01)
USPC .................................................. 703/8; 703/2

(58) Field of Classification Search
CPC . G05B 17/02; G01M 17/007; B60T 8/17555; G09B 19/167; G09B 9/05; G09B 23/00
USPC ............... 703/8, 2; 705/4, 400; 340/901, 438; 701/1, 29, 31, 32, 33
See application file for complete search history.

(56) References Cited

U.S. PATENT DOCUMENTS

| | | | | |
|---|---|---|---|---|
| 6,129,025 A * | 10/2000 | Minakami et al. | ......... | 104/88.01 |
| 7,239,945 B2 * | 7/2007 | Hiemer et al. | ............... | 701/32.2 |
| 7,487,074 B2 * | 2/2009 | Ohtsu et al. | ....................... | 703/8 |
| 7,680,639 B2 * | 3/2010 | Schoeggl | .......................... | 703/8 |
| 7,681,960 B2 * | 3/2010 | Wanke et al. | ................. | 303/146 |
| 7,821,421 B2 * | 10/2010 | Tamir et al. | .................. | 340/901 |
| 8,301,363 B2 * | 10/2012 | Grassi | .......................... | 701/119 |
| 2005/0192736 A1 * | 9/2005 | Sawada et al. | ................ | 701/117 |
| 2008/0167820 A1 * | 7/2008 | Oguchi et al. | ................ | 701/301 |

(Continued)

FOREIGN PATENT DOCUMENTS

| | | |
|---|---|---|
| EP | 1569186 | 8/2005 |
| JP | 11-161894 A | 6/1999 |

(Continued)

OTHER PUBLICATIONS

Gindele et al., "A Probabilistic Model for Estimating Driver Behaviors and Vehicle Trajectories in Traffic Environments", IEEE Annual Conference on Intelligent Transportation Systems, 2010, pp. 1625-1631.*

*Primary Examiner* — Omar Fernandez Rivas
*Assistant Examiner* — Iftekhar Khan
(74) *Attorney, Agent, or Firm* — Fujitsu Patent Center

(57) ABSTRACT

A vehicle behavior estimation device includes: a storage unit configured to store a restriction condition at a point of a vehicle for which behavior is estimated; vehicle state data that includes position information and speed information of the vehicle; behavior parameters that include speed information and acceleration information of the vehicle; and physical restriction conditions that include an upper limit and a lower limit of the acceleration information; and a processor configured to obtain the vehicle state data by using the restriction condition at the point; calculate behavior parameters of a vehicle model that satisfy a physical restriction condition from the vehicle state data and the restriction condition at the point; update the vehicle state data of the vehicle model based on the behavior parameters; and repeat processing to calculate behavior parameters by using the updated vehicle state data and to update the vehicle state data.

16 Claims, 41 Drawing Sheets

(56) References Cited

U.S. PATENT DOCUMENTS

2010/0152956 A1* 6/2010 Frauenkron .................. 701/29
2011/0106381 A1* 5/2011 Filev et al. .................. 701/40
2011/0288732 A1* 11/2011 Kuwahara et al. ............ 701/54

FOREIGN PATENT DOCUMENTS

| | | |
|---|---|---|
| JP | 2001-67592 A | 3/2001 |
| JP | 2005-242688 A | 9/2005 |
| JP | 2009-19920 A | 1/2009 |

* cited by examiner

| VEHICLE ID | POSITION | PASSING TIME | PASSING SPEED |
|---|---|---|---|
| A | $s_1$ | $t_{1a}$ | $v_{1a}$ |
| A | $s_2$ | $t_{1a}$ | $v_{2a}$ |
| ... | ... | ... | ... |
| B | $s_1$ | $t_{1b}$ | $v_{1b}$ |
| B | $s_2$ | $t_{1b}$ | $v_{2b}$ |
| ... | ... | ... | ... |

FIG. 6

| VEHICLE ID | POSITION COORDINATES | SPEED | ... |
|---|---|---|---|
| A | (x,y) | 6(m/s) | ... |
| B | (x,y) | 11(m/s) | ... |
| ... | ... | ... | ... |

| VEHICLE ID | TARGET SPEED | TARGET ACCELERATION | ... |
|---|---|---|---|
| A | 16(m/s) | 1(m/s$^2$) | ... |
| B | 10(m/s) | -0.5(m/s$^2$) | ... |
| ... | ... | ... | ... |

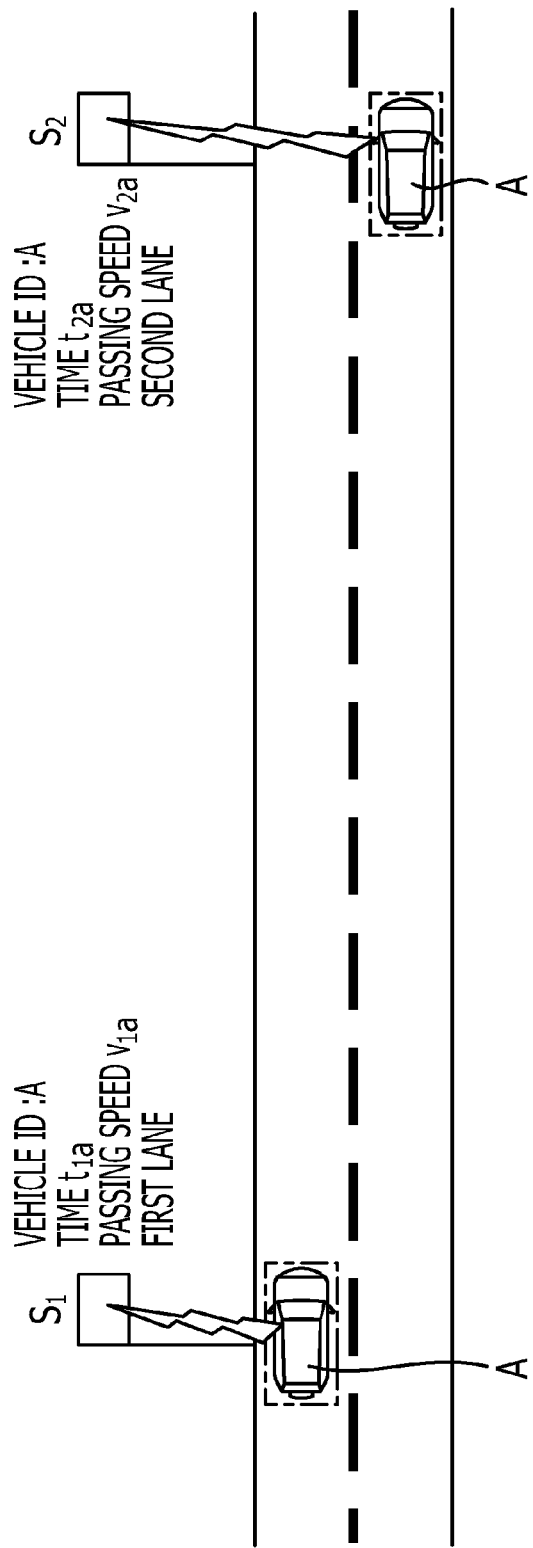

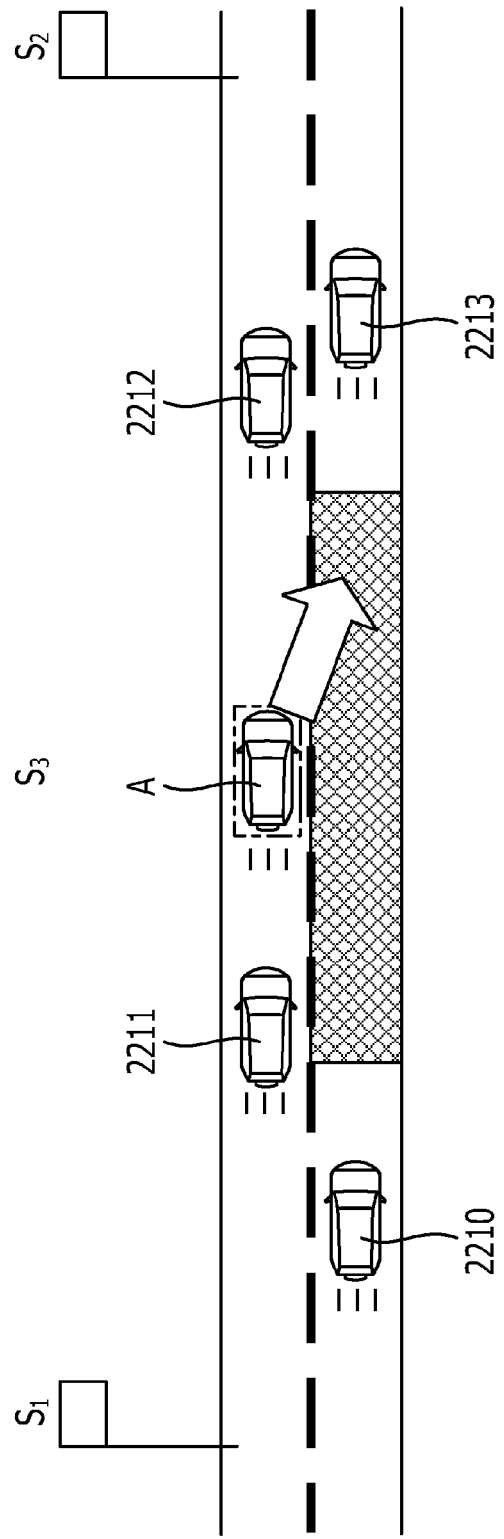

| VEHICLE ID | POSITION | DRIVING TIME | DRIVING SPEED | PASSING LANE |
|---|---|---|---|---|
| A | $s_1$ | $t_{1a}$ | $v_{1a}$ | 1 |
| B | $s_2$ | $t_{2a}$ | $v_{2a}$ | 2 |
| ... | ... | ... | ... | ... |

| VEHICLE ID | TARGET LANE | ... |
|---|---|---|
| A | 2 | ... |
| B | 1 | ... |
| ... | ... | ... |

| VEHICLE ID | POSITION | PASSING TIME | | PASSING SPEED | |
|---|---|---|---|---|---|
| | | ESTIMATION | DIFFERENCE | ESTIMATION | DIFFERENCE |
| A | $s_1$ | $t_{s1a}$ | +1s | $v_{s1a}$ | +1m/s |
| A | $s_2$ | $t_{s2a}$ | -3s | $v_{s2a}$ | -3m/s |
| ... | ... | ... | ... | ... | ... |
| B | $s_1$ | $t_{s1b}$ | 0s | $v_{s1b}$ | 0m/s |
| B | $s_2$ | $t_{s2b}$ | +10s | $v_{s2b}$ | +3m/s |
| ... | ... | ... | ... | ... | ... |

| VEHICLE ID | POSITION | PASSING TIME | PASSING SPEED |
|---|---|---|---|
| A | $s_1$ | $t_{1a}$ | $v_{1a}$ |
| A | $s_2$ | $t_{2a}$ | $v_{2a}$ |
| A | $s_3$ | $t_{3a}$ | $v_{3a}$ |
| ... | ... | ... | ... |

FIG. 30

| SETTING ID | STATUS | | DURATION | ... |
|---|---|---|---|---|
| | a SIDE | b SIDE | | |
| P1 | RED, GREEN | | $t_1$ | ... |
| | RED, YELLOW | | $t_2$ | |
| | RED, RED | | $t_3$ | |
| | GREEN, RED | | $t_1$ | |
| | YELLOW, RED | | $t_5$ | |
| | RED, RED | | $t_6$ | |
| ... | ... | | ... | ... |
| ... | ... | | ... | ... |

| SIGNAL ID | STATUS | UPDATE TIME | SETTINGS | | ... |
| | | | ID | DIRECTION | |
|---|---|---|---|---|---|
| A | RED | $t_s$ | P1 | a | ... |
| B | GREEN | $t_s$ | P1 | b | ... |
| ... | ... | ... | | | ... |

3100

VEHICLE BEHAVIOR ESTIMATION DEVICE

CROSS-REFERENCE TO RELATED APPLICATIONS

This application is based upon and claims the benefit of priority of the prior Japanese Patent Application No. 2010-137333, filed on Jun. 16, 2010, the entire contents of which are incorporated herein by reference.

FIELD

The embodiments discussed herein relate to a vehicle behavior estimation device and method thereof.

BACKGROUND

In order to grasp a traffic state in a road, observation data of vehicles that pass the road is collected and behaviors of the vehicles are estimated based on the collected observation data.

For example, JP. 11-161894 discusses a device to estimate behaviors of vehicles by collecting observation data such as passing time and speed using sensors such as beacons by taking account of lighting timing of traffic lights.

The device estimates behavior of vehicles that at least the time information when passing an observation point match with observation data detected by a sensor.

JP 2005-242688 discusses a simulator that simulates behavior of a driver and physical behavior of a vehicle by taking account of influence of surrounding vehicles, traffic signals, railroad crossings and other factors that influence driving vehicles.

The device simulates behavior of a driver and physical behavior of a vehicle by using a vehicle model. The vehicle model includes behavior parameters such as target acceleration and a target speed. A position and speed of the vehicle are determined according to the behavior parameters.

SUMMARY

According to an aspect of the invention, a vehicle behavior estimation device includes: a storage unit configured to store a restriction condition at a first point and a second point of a vehicle for which behavior is estimated; vehicle state data that includes at least position information and speed information of the vehicle; behavior parameters that include at least speed information and acceleration information of the vehicle; and physical restriction conditions that include at least an upper limit and a lower limit of the acceleration information; and a processor configured to obtain the vehicle state data by using the restriction condition at the first point; calculate behavior parameters of a vehicle model that satisfy a physical restriction condition from the vehicle state data and the restriction condition at the second point; update the vehicle state data of the vehicle model based on the behavior parameters; and repeat processing to calculate behavior parameters by using the updated vehicle state data and to update the vehicle state data.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a restriction condition table;

FIG. 6 illustrates a vehicle state data table;

FIG. 7 illustrates a behavior parameter table;

FIG. 22A illustrates an example of observation data that includes passing lane information;

FIG. 22B illustrates lane changing based on a restriction condition;

FIG. 23 illustrates a restriction condition table;

FIG. 24 illustrates behavior parameters;

FIG. 25 illustrates a restriction condition satisfaction state data table;

FIG. 27 illustrates a restriction condition table;

FIG. 30 illustrates a signal setting data table;

FIG. 31 illustrates a signal state data table;

DESCRIPTION OF EMBODIMENTS

Figure 38:
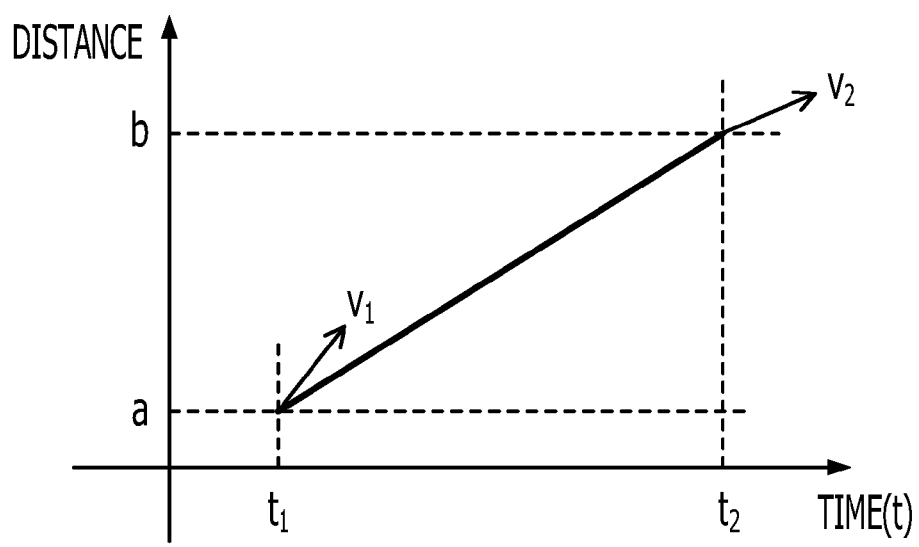
FIG. 38 illustrates a relationship between time and position of a vehicle model.
Figure 39:
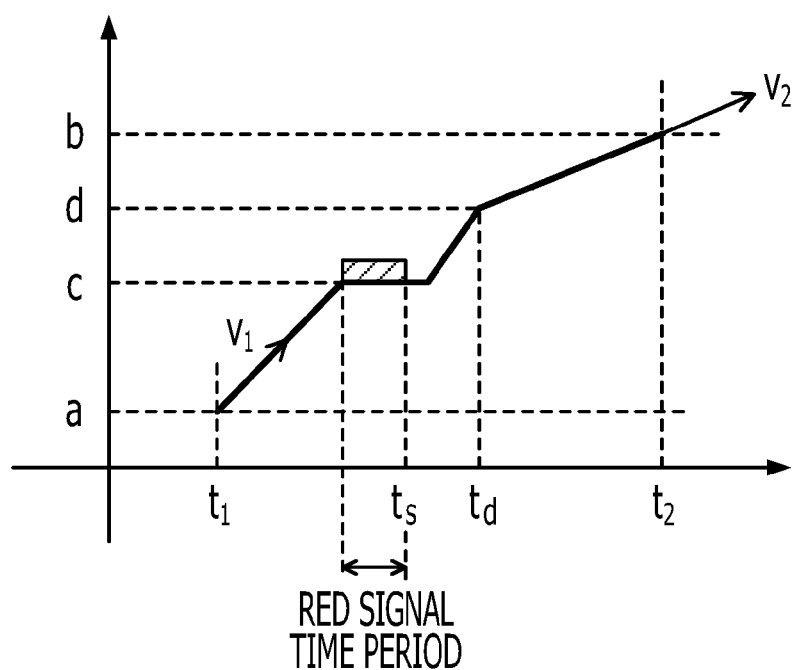
FIG. 39 illustrates a relationship between time and position of a vehicle model.

FIGS. 38 and 39 illustrate a virtual simulation device. The examples in FIGS. 38 and 39 illustrate a vehicle passes two observation points "a" and "b."

In the two examples, the vehicle passes the observation point "a" at time t1, and passes the observation point "b" at time t2. The virtual simulation device estimates behavior of the vehicle that passes the observation point "a" at time t1, and passes the observation point "b" at time t2.

The observation point is used for convenience of explanation. Thus, the observation point is identified for calculation purpose and not necessarily a point where a sensor actually monitors a current state. For example, the observation point may include a point determined by a calculation result.

FIG. 38 illustrates an example of estimating vehicle behavior when no signalized intersection exists between two observation points "a" and "b."

It is assumed that a vehicle that passes a first point "a" with a first speed $v_1$ at time $t_1$ passes a second point "b" with a second speed $v_2$ at time $t_2$.

In this case, the device estimates the vehicle behavior by assuming a vehicle speed between the first point "a" and the second point "b" is substantially constant speed $(b-a)/(t_2-t_1)$.

FIG. 39 illustrates estimating vehicle behavior when a signalized intersection is present between the two observation points "a" and "b."

A vehicle that passes a first point "a" with a first speed $v_1$ at time $t_1$ passes a second point "b" with a second speed $v_2$ at time $t_2$ is the same as the case described above. A point "c" and a point "d" are present between the first point "a" and the second point "b." A signalized intersection is present at the point "c", and an intersection without a signal is present at the point "d."

In this case, vehicle behavior is estimated by assuming the vehicle travels with a substantially constant speed of the first speed $v_1$ that is a speed when the vehicle passes the first point and by assuming the vehicle travels from the point d to the second point b with a substantially constant speed of $(b-d)/(t_2-t_d)$. The vehicle behavior is estimated by assuming that the vehicle stops for time required according to the red signal and the number of vehicles waits for the signal at the signalized intersection at the point "c."

The above-described device estimates vehicle behavior between observation points where the sensors are installed by using observation data of a vehicle detected by the sensors.

According to the device, time when a vehicle passes an observation point matches with observation data obtained from the sensor. However, the device assumes the vehicle travels substantially constant travel speed other than changing the speed at the intersection. Therefore the estimated behavior is extremely different from the actual vehicle behavior.

For example, the speed sharply changes to an extent that is not physically likely to happen in reality. Moreover, vehicle behavior that takes account of traffic state other than traffic signals is not estimated.

Estimating vehicle behavior that is close to actual vehicle behavior may be difficult to achieve by taking account of typically one of passing time or a speed when the vehicle passes the observation point.

An example below describes a device that simulates vehicle behavior according to a surrounding traffic state by taking account of influence of other vehicles.

The device simulates vehicle behavior by simply cumulatively calculates behavior and conditions of respective vehicles. The device sets various rules and changes parameters frequently in order to make simulation of the vehicle behavior close to actual vehicle behavior.

The device simulates the vehicle behavior according to the surrounding traffic state by taking account of influence of other vehicles. However, the device does not check consistency of time and speed of the vehicle detected at a plurality of observation points. Therefore, the device does not estimate the vehicle behavior that is consistent with observation data detected at the plurality of points.

Estimating vehicle behavior that is close to actual behavior may be difficult to achieve by taking account of typically one observation point where the vehicle passes.

According to the embodiments, vehicle behavior that satisfies restriction conditions such as passing time and a speed when the vehicle passes an observation point is estimated. Vehicle behavior that is close to actual behavior is estimated while satisfying restriction conditions of passing the plurality of observation points by taking account of physical laws and the surrounding traffic state.

The vehicle behavior estimation device estimates behavior of a vehicle that satisfies restriction conditions when passing observation points. The vehicle behavior estimation device includes a behavior parameter calculation unit, a vehicle model calculation unit, and a simulation control unit. The vehicle behavior estimation device stores calculation parameters used by the behavior parameter calculation unit and the vehicle model calculation unit. The calculation parameters include a substantially maximum acceleration that indicates an upper limit of acceleration specifying a physical restriction condition. Moreover, the calculation parameters include a substantially maximum deceleration that indicates a lower limit of acceleration specifying a physical restriction condition. Furthermore, the calculation parameters may include rotation of wheels, and friction between tires and a road surface that specify physical vehicle body behavior.

The behavior parameter calculation unit calculates behavior parameters of a vehicle model that satisfy the restriction conditions. The vehicle model calculation unit determines behavior of a vehicle model based on the behavior parameters and outputs vehicle state data of the vehicle model. The simulation control unit makes the behavior parameter calculation unit and the vehicle model calculation unit execute processing at a substantially constant time interval, for example.

The vehicle behavior estimation device determines vehicle behavior based not only on restriction conditions when a vehicle passes a certain point but also physical restrictions and restrictions that the driver may take account of during driving. Accordingly, the vehicle behavior estimation device estimates vehicle behavior with high accuracy.

Details of the vehicle behavior estimation device will be described by referring to illustrated embodiments.

Outline Configuration

Figure 1:
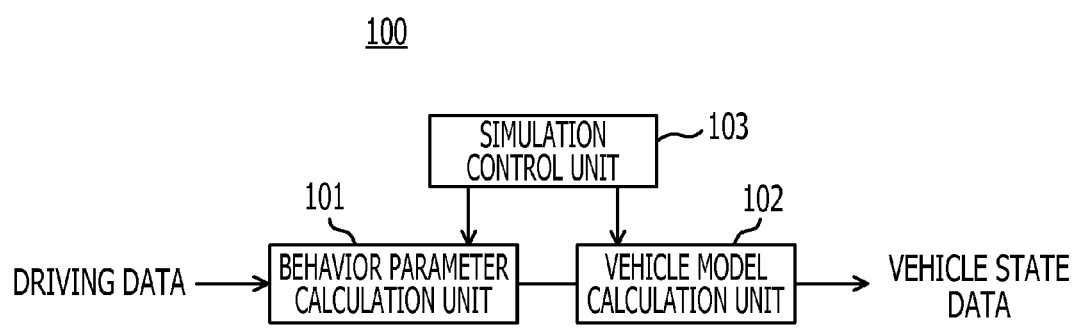
FIG. 1 is a functional block diagram illustrating an outline configuration of a vehicle behavior estimation device.

FIG. 1 is a functional block diagram illustrating an outline configuration of a vehicle behavior estimation device.

A vehicle behavior estimation device 100 includes a behavior parameter calculation unit 101, a vehicle model calculation unit 102, and a simulation control unit 103.

The behavior parameter calculation unit 101 calculates behavior parameters of a vehicle model that satisfies restriction conditions when the vehicle passes an observation point.

The restriction conditions when the vehicle passes an observation point are, for example, generated based on observation data of a vehicle detected by a sensor installed at an observation point along a road. The restriction conditions may include time when the vehicle model passes the observation point and conditions related to a speed, for example.

The behavior parameter calculation unit 101 assumes a value that satisfies restriction conditions when a vehicle passes a first observation point as an initial value of vehicle state data. The behavior parameter calculation unit 101 calculates behavior parameters based on the vehicle state data and restriction conditions when the vehicle passes the next observation point.

The behavior parameters may include a target speed of the vehicle model. The behavior parameters may include target acceleration of the vehicle model.

The vehicle model calculation unit 102 determines behavior of the vehicle model based on the behavior parameters calculated by the behavior parameter calculation unit 101 and outputs vehicle state data.

The vehicle model calculation unit 102 calculates a driver model that simulates driving behavior of the driver of the vehicle based, for example, on the behavior parameters. The vehicle model calculation unit 102 calculates a vehicle body movement model that simulates a physical movement of the vehicle body based on the calculated driving behavior of the driver model. The vehicle model calculation unit 102 may update vehicle state data at the time of calculating the vehicle model based on the calculated vehicle movement model.

A simulation control unit 103 makes the behavior parameter calculation unit 101 and the vehicle model calculation unit 102 execute processing at a substantially constant time interval, for example.

Figure 2:
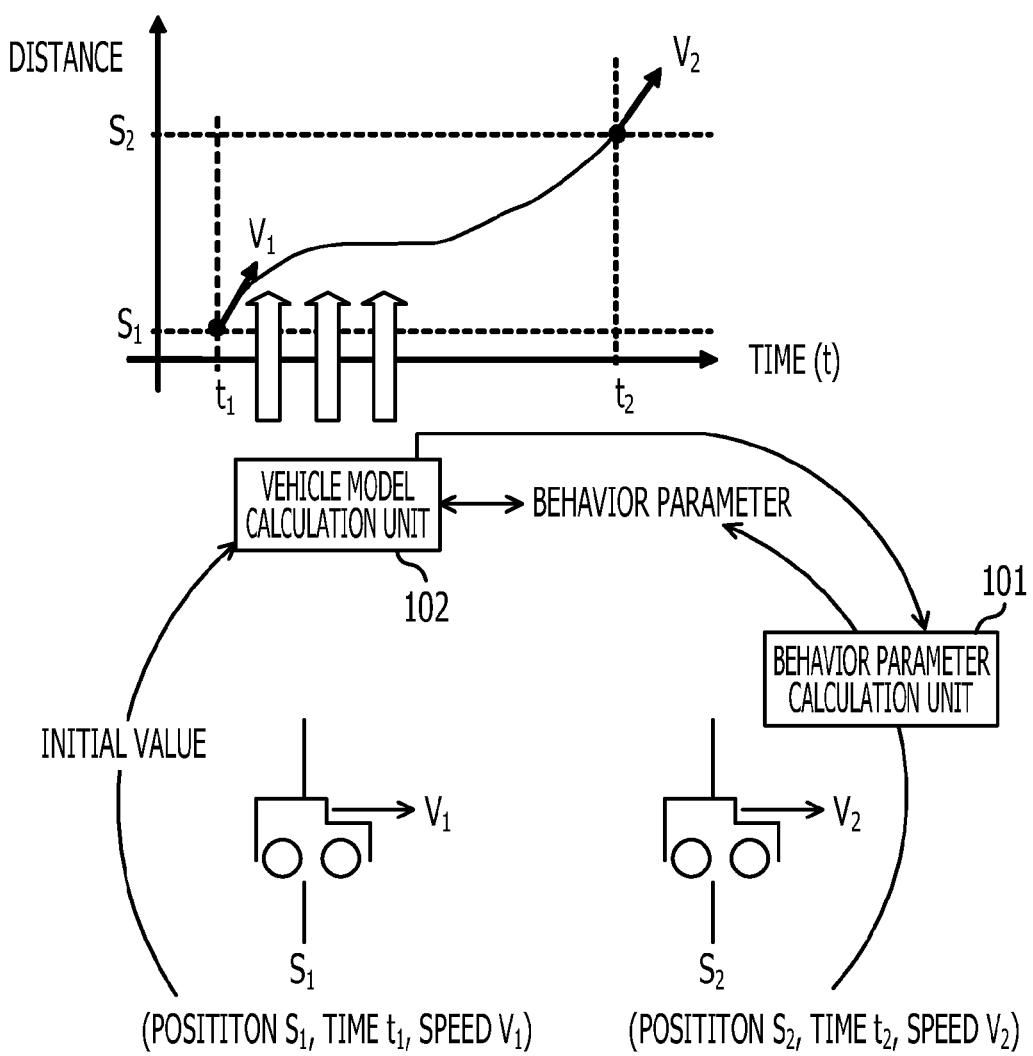
FIG. 2 illustrates an outline of processing by the vehicle behavior estimation device.

FIG. 2 illustrates processing by the vehicle behavior estimation device 100.

Passing an observation point $s_1$ with a speed $v_1$ at a first time $t_1$ and passing an observation point $s_2$ with a speed $v_2$ at a second time $t_2$ are assumed to be restriction conditions.

The vehicle model calculation unit 102 generates a vehicle model in which a value that satisfies restriction conditions when passing the observation point $s_1$ is set as initial values. The vehicle model calculation unit 102 provides a vehicle model that travels the observation point $s_1$ with the speed $v_1$ at the first time $t_1$.

The vehicle state data of the vehicle model generated by the vehicle model calculation unit 102 is stored in a storage area. For example, the vehicle state data includes position information and speed information at the time of calculating the vehicle model. The vehicle model calculation unit 102 determines the vehicle model behavior based on the behavior parameters and outputs vehicle state data.

The behavior parameter calculation unit 101 calculates behavior parameter based on restriction conditions when the vehicle passes the next observation point $s_2$ and the vehicle state data at the time of calculation. The behavior parameter calculation unit 101 calculates parameters related to behavior of a vehicle model so that the vehicle model travels the next observation point $s_2$ with a speed $v_2$ at second time $t_2$. The behavior parameter calculation unit 101 calculates, for example, a target speed and target acceleration of the vehicle model.

The vehicle model calculation unit 102 determines behavior of the vehicle model calculated by the behavior parameter calculation unit 101 and calculates vehicle state data. The vehicle model calculation unit 102 may include a driver model that determines driving behavior of the driver and a vehicle body movement model that determines physical behavior of the vehicle body.

The driver model determines behavior of the driver by taking account of surrounding vehicle models, traffic signals, railroad crossings and other traffic environments. The vehicle body movement model determines physical vehicle body behavior such as rotation of wheels, and friction between tires and a road surface.

The simulation control unit 103 makes the behavior parameter calculation unit 101 and the vehicle model calculation unit 102 execute processing at a substantially constant time interval, for example.

The simulation control unit 103 makes the behavior parameter calculation unit 101 calculate behavior parameters based on vehicle state data that is output by the vehicle model calculation unit 102 and restriction conditions at the next observation point at a substantially constant time interval. The vehicle model calculation unit 102 identifies behavior of the vehicle model based on the behavior parameters updated with a substantially constant interval, and calculates and outputs the vehicle state data of the vehicle model.

The simulation control unit 103 may change simulation accuracy by adjusting the time interval of processing by the behavior parameter calculation unit 101 and the vehicle model calculation unit 102.

The vehicle behavior estimation device 100 may estimate behavior of a plurality of vehicles that appear in substantially the same time period. The vehicle behavior estimation device 100 stores vehicle state data for each vehicle model output by the vehicle model calculation unit 102 in a storage area.

In this case, the vehicle model calculation unit 102 may calculate driving behavior of the driver influenced by vehicle state data of another vehicle model and may determine behavior of the vehicle model based on the calculated driving behavior of the driver. In this case, the vehicle model calculation unit 102 may estimate vehicle behavior by taking account of influence of surrounding vehicle models.

Behavior of the vehicle model is represented by the vehicle state data output by the vehicle model calculation unit 102. The behavior of the vehicle model is calculated so as to follow physical laws. The behavior of the vehicle model does not include, as illustrated in FIG. 2, any unnatural behavior such as excessive abrupt acceleration and an abrupt stop while the vehicle travels from the first observation point $s_1$ and reaches the second observation point $s_2$.

Embodiment

An embodiment of a vehicle behavior estimation device is described.

Figure 3:
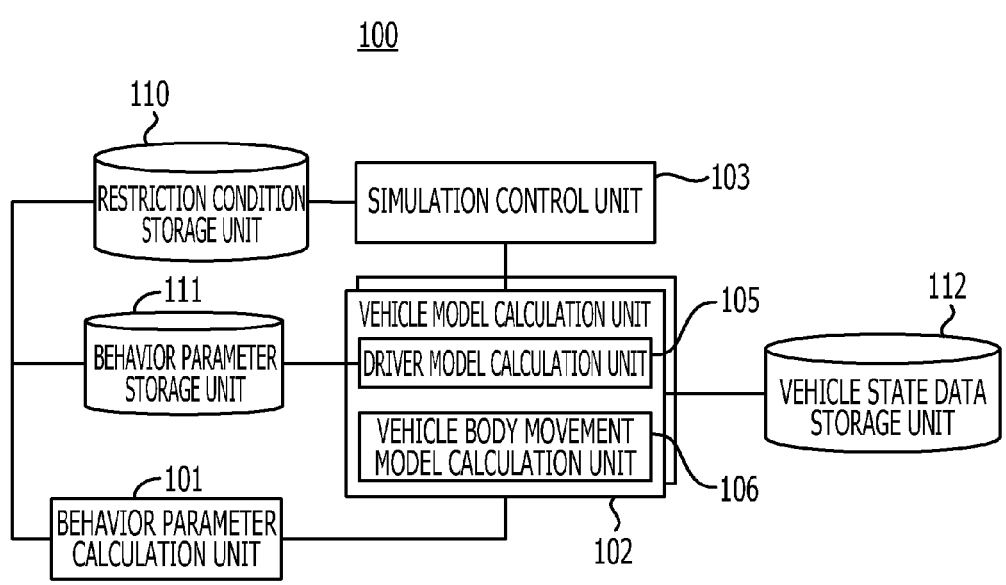
FIG. 3 is a block diagram illustrating a functional block diagram of the vehicle behavior estimation device according to one embodiment.

FIG. 3 is a functional block diagram of the vehicle behavior estimation device according to the embodiment.

Here, a configuration is illustrated in which various types of databases are added to the basic configuration illustrated in the outline configuration.

A vehicle behavior estimation device 100 includes a restriction condition storage unit 110 that stores restriction conditions when a vehicle passes an observation point.

The restriction conditions stored in the restriction condition storage unit 110 include, for example, time and a speed when a vehicle passes the observation point. The restriction conditions may be generated based on observation data.

A behavior parameter storage unit 111 stores behavior parameters calculated by a behavior parameter calculation unit 101. The behavior parameter storage unit 111 stores, for example, a target speed and target acceleration at the time of calculation.

A vehicle state data storage unit 112 stores, for example, position information and speed information when the vehicle model that is simulated by a simulation control unit 103 is calculated.

A vehicle model calculation unit 102 includes a driver model calculation unit 105 that simulates behavior of the driver of the vehicle, and a vehicle body movement model calculation unit 106 that simulates a physical movement of the vehicle body.

The driver model calculation unit 105 simulates behavior of the driver based on behavior parameters at the time of calculation. The driver model calculation unit 105 simulates driver behavior in a long period, that in an intermediate period, and that in a short period.

For example, the driver behavior in the long period includes a route selection behavior in a long period. The driver behavior in the intermediate period includes driving behavior such as free drive, vehicle-following driving, and a stop by a signal in the intermediate period. The driver behavior in the short period includes a pedal operation and a steering wheel operation in the short period.

The driver model calculation unit 105 determines a steering, an accelerator and a brake pedal operation amounts and transmits to the vehicle body movement model calculation unit 106.

The vehicle model calculation unit 102 simulates physical behavior of a vehicle body. The vehicle model calculation unit 102 simulates, for example, rotation of wheels, and friction between tires and a road surface and determines a position of a vehicle model in a coordinate system and the speed. A vehicle movement model is known in the related art and the details will not be described.

As described above, the restriction condition storage unit 110 stores restriction conditions of passing time and the speed when a vehicle passes an observation point.

The simulation control unit 103 makes the vehicle model calculation unit 102 generate a vehicle model in which a value that satisfies restriction conditions at a first observation point is set as initial values. Vehicle state data at this time may be position information and the speed of the vehicle model that passes the observation point.

The behavior parameter calculation unit 101 calculates behavior parameters based on restriction condition at the next observation point among restriction conditions stored in the restriction condition storage unit 110 and vehicle state data at the time of calculation.

FIG. 4 illustrates an example of a restriction condition table stored in the restriction condition storage unit 110.

A restriction condition table 400 includes columns of a vehicle ID, a position, passing time, and a passing speed and may store time and the speed when a vehicle passes an observation point for each vehicle.

The vehicle ID column stores a vehicle identification symbol to identify a vehicle. At observation, the same vehicle that passes a plurality of observation points may be identified from vehicles that pass the observation points by a vehicle number, characteristic of a vehicle body, and a passage order. Accordingly, the same vehicle ID may be included in restriction conditions when the restriction conditions are generated from observation data of the same vehicle.

The position column stores position coordinates of the observation point. When the restriction conditions are generated from the observation data, the position to be stored in the position column is where a sensor that detects the observation data is installed.

The columns of passing time and passing speed store time when a vehicle passes the observation point and the speed. When restriction conditions are generated from the observation data, the conditions are set based on passing time when a vehicle passes where a sensor is, and the speed at that time.

Figure 5:
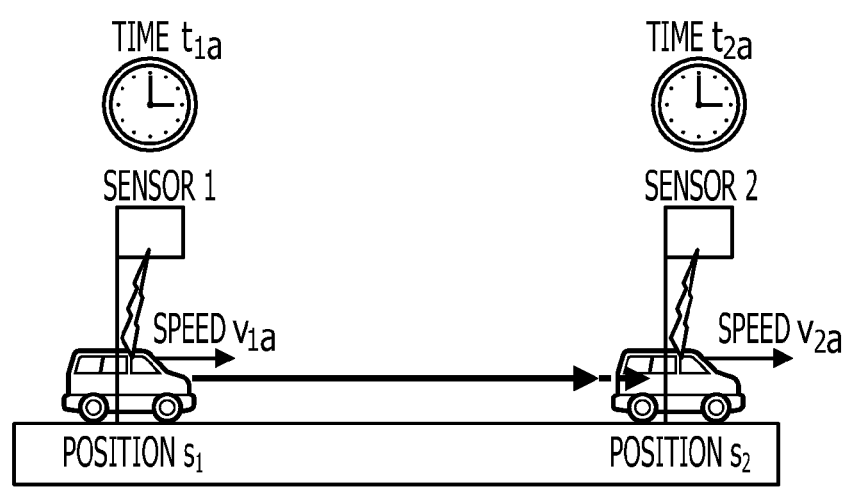
FIG. 5 illustrates observation data.

FIG. 5 illustrates observation data

As illustrated in FIG. 5, a vehicle with a vehicle ID "A" is assumed to pass an observation point $s_1$ with a speed $v_{1a}$ at time $t_{1a}$.

In this case, a first sensor installed at the observation point $s_1$ detects the passing time $t_{1a}$ and the passing speed $v_{1a}$ as observation data of the vehicle A. The restriction conditions generated from the above-described observation data are stored in the restriction condition storage unit 110.

Likewise, when the vehicle with a vehicle ID "A" passes an observation point $s_2$ with a speed $v_{2a}$ at time $t_{2a}$, a second sensor installed at the point $s_2$ detects the passing time $t_{2a}$ and the passing speed $v_{2a}$ as observation data of the vehicle A. The detected passing time $t_{2a}$ and the passing speed $v_{2a}$ are used as observation data of the vehicle "A." Restriction conditions generated from the observation data are stored in the restriction condition storage unit 110.

Similarly, sensors installed at respective observation points detect when a vehicle with a vehicle ID "B" passes a point $s_1$ with a speed $v_{1b}$ at time $t_{1b}$, and a point $s_2$ with a speed $v_{2b}$ at time $t_{2b}$. The restriction conditions generated from the detected observation data of the vehicle ID "B" are stored in the restriction condition storage unit 110.

The vehicle model calculation unit 102 generates a vehicle model in which a value that satisfies the first restriction conditions are assumed as vehicle state data and stores the vehicle state data at that time in the vehicle state data storage unit 112.

For example, when restriction conditions at a point $s_1$ is the first restriction conditions, the vehicle model calculation unit 102 generates a vehicle model in which a value that satisfies the restriction conditions at the point $s_1$ is assumed as initial values of the vehicle state data and stores the vehicle state data in the vehicle state data storage unit 112.

FIG. 6 illustrates an example of a vehicle state data table stored in the vehicle state data storage unit 112.

A vehicle state data table 600 includes columns of a vehicle ID, position coordinates, and a speed.

The vehicle ID column stores a vehicle identification symbol to identify a vehicle.

The position coordinates column stores position information of a vehicle model at the time of calculation. The position coordinates stored in the position coordinates column are updated by the vehicle model calculation unit 102 as initial values that satisfy the first restriction conditions.

The speed column stores speed information of a vehicle model at the time of calculation. The speed information stored in the speed column is updated by the vehicle model calculation unit 102 as an initial value that satisfies the first restriction condition.

The behavior parameter calculation unit 101 calculates behavior parameters from the restriction conditions at the next observation point and vehicle state data at the time of calculation stored in the vehicle state data storage unit 112.

When the next observation point is an observation point $s_2$ illustrated in FIG. 4, the behavior parameter calculation unit 101 calculates a target speed and target acceleration from the position information and the speed information of the vehicle state data at the time of calculation so that a speed at passing time $t_{2a}$ becomes $v_{2a}$.

FIG. 7 illustrates an example of a behavior parameter table stored in the behavior parameter storage unit 111.

A behavior parameter table 700 includes columns of a vehicle ID, a target speed, and target acceleration.

The vehicle ID column stores a vehicle identification symbol to identify a vehicle.

The target speed column stores a target speed calculated by the behavior parameter calculation unit 101 as a behavior parameter.

The target acceleration speed column stores target acceleration calculated by the behavior parameter calculation unit 101 as a behavior parameter.

The vehicle model calculation unit 102 determines behavior of a vehicle model based on behavior parameter calculated by the behavior parameter calculation unit 101 and stored in the behavior parameter storage unit 111. As illustrated in FIG. 7, when a target speed and target acceleration are behavior parameters, the vehicle model calculation unit 102 determines behavior of the vehicle model so that the speed is accelerated or decelerated at target acceleration until the speed reaches the target speed.

Other Embodiment

A vehicle behavior estimation device according to one embodiment will be described hereunder.

Figure 8:
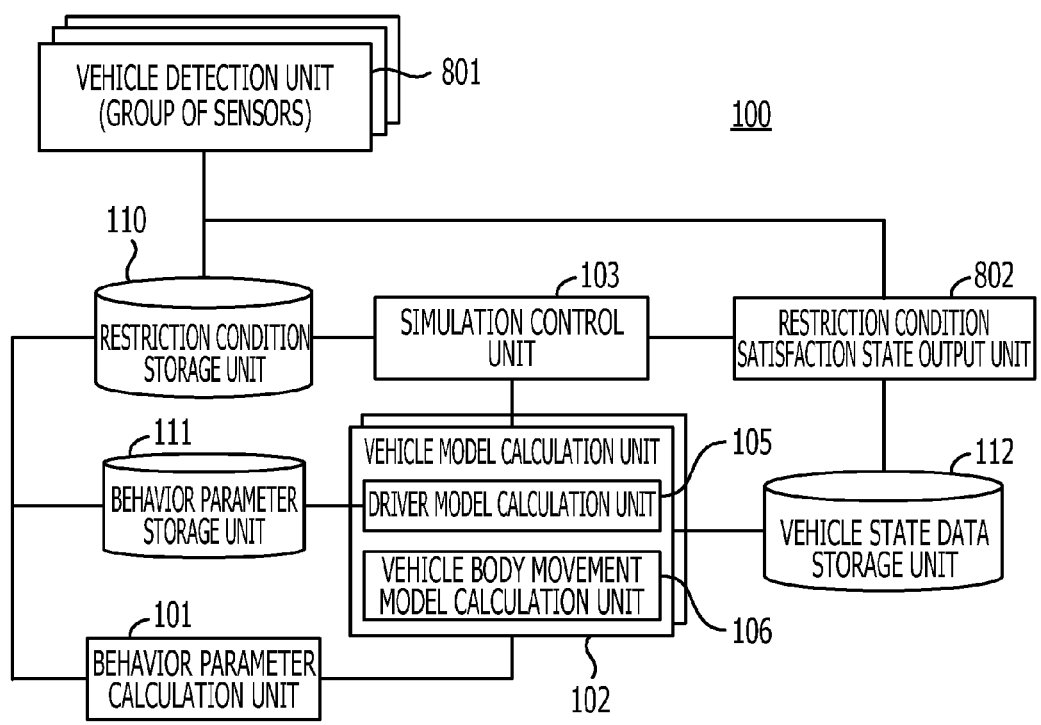
FIG. 8 is a functional block diagram illustrating a vehicle behavior estimation device according to one embodiment.

FIG. 8 is a functional block diagram illustrating a vehicle behavior estimation device according to one embodiment.

Configurations of a behavior parameter calculation unit 101, a vehicle model calculation unit 102, a simulation control unit 103, a restriction condition storage unit 110, a behavior parameter storage unit 111, and a vehicle state data storage unit 112 are substantially the same as those of the above described embodiment.

A vehicle behavior estimation device 100 generates restriction conditions to be stored in the restriction condition storage unit 110 from observation data detected by a vehicle detection unit 801.

The vehicle behavior estimation device 100 includes a restriction condition satisfaction state output unit 802 to determine how much behavior of a vehicle model calculated by the vehicle model calculation unit 102 satisfies the restriction conditions.

A group of sensors installed at observation points along a road may be used as the vehicle detection unit 801. The vehicle detection unit 801 detects passing time and the passing speed of a vehicle at an observation point. The vehicle detection unit 801 generates restriction conditions based on the detected observation data and stores the restriction conditions in the restriction condition storage unit 110.

The restriction condition satisfaction state output unit 802 determines how much vehicle state data calculated by the vehicle model calculation unit 102 satisfies the restriction conditions stored in the restriction condition storage unit 110.

Figure 9:
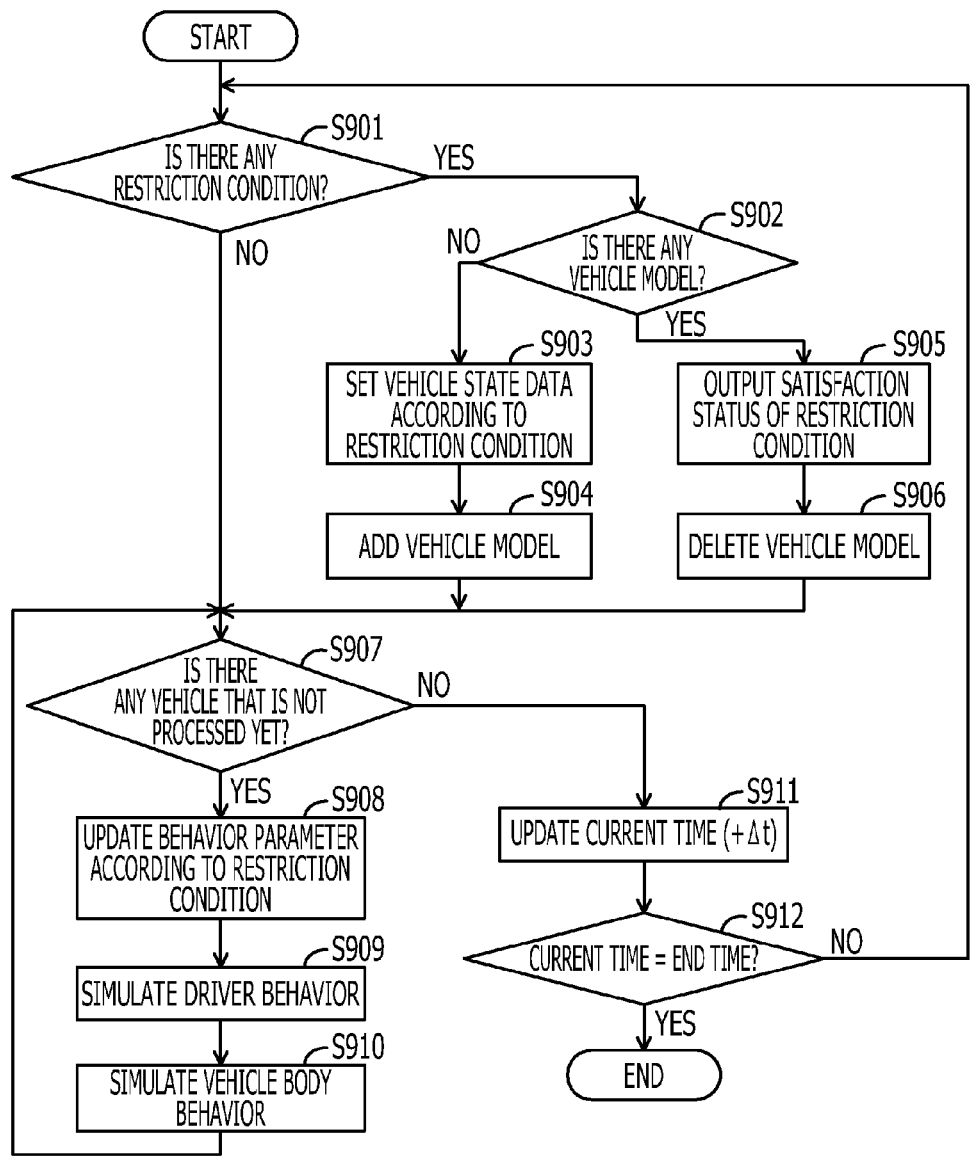
FIG. 9 is a flow chart of a vehicle behavior estimation device according to one embodiment.

FIG. 9 is a flow chart of the vehicle behavior estimation device 100 according to one embodiment.

At operation S901, the vehicle behavior estimation device 100 determines whether there is any restriction condition that includes passing time that matches with time when simulation is calculated.

The simulation control unit 103 searches the restriction conditions stored in the restriction condition storage unit 110. When there is any restriction condition that includes passing time that matches with time when simulation is calculated, the process proceeds to Operations S902, and otherwise, the process proceeds to Operations S907.

At operation S902, the vehicle behavior estimation device 100 determines whether any vehicle model that satisfies the restriction condition in which the passing time of the vehicle matches with time when simulation is calculated is already present.

The simulation control unit 103 determines whether the restriction condition corresponds to the vehicle model controlled by the vehicle model calculation unit 102. The process proceeds to S903 when the vehicle model is not present. The process proceeds to S905 when the vehicle model is already present.

At Operation S903, the vehicle behavior estimation device 100 sets vehicle state data based on the restriction conditions. The vehicle model calculation unit 102 sets vehicle state data of a vehicle model that is newly provided based on the restriction conditions obtained from the restriction condition storage unit 110. Position information and speed information at the observation point is set as initial values of the vehicle state data if the restriction conditions stored in the restriction condition storage unit 110 include speed information when the vehicle passes the observation point.

At Operation S904, the vehicle behavior estimation device 100 adds a new vehicle model. The vehicle model calculation unit 102 adds a vehicle model in which values that satisfy the restriction conditions obtained from the restriction condition storage unit 110 is set as initial values.

At Operation S907, the vehicle behavior estimation device 100 determines whether any vehicle model for which processing is not executed yet among all of the vehicle models for which simulations are to be executed.

Here, whether vehicle state data when simulation is calculated is updated for vehicle models controlled by the vehicle model calculation unit 102 is determined. When the determination reveals that there is a vehicle model for which processing is not executed yet, the process proceeds to Operation S908. When the determination reveals that processing is executed for all of the vehicle models, the process proceeds to Operation S911.

At Operation S908, the vehicle behavior estimation device 100 updates behavior parameters based on the restriction conditions. The behavior parameter calculation unit 101 calculates a target speed and target acceleration from the restriction conditions stored in the restriction condition storage unit 110 and vehicle state data at the time of calculation and stores the calculated results to the behavior parameter storage unit 111 as behavior parameters.

At Operation S909, the vehicle behavior estimation device 100 simulates driving behavior of the driver. Here, the driver model calculation unit 105 simulates driving behavior of the driver based, for example, on surrounding traffic environment information and target route information. Driving behavior such as a steering operation amount, and an accelerator and brake pedal operation amount are calculated for simulation based, at least, on the target speed and target acceleration calculated by the behavior parameter storage unit 111.

At Operation S910, the vehicle behavior estimation device 100 simulates behavior of a vehicle body. The vehicle body movement model calculation unit 106 simulates vehicle body movement behavior based on movement behavior calculated by the driver model calculation unit 105 and calculates vehicle state data based, for example, on a steering operation amount, and an accelerator and brake pedal operation amount.

The process proceeds to Operation S907. The vehicle state data for all of the vehicle models is updated.

At Operation S911, the vehicle behavior estimation device 100 updates time when simulation is calculated. The simulation control unit 103 increments the time when simulation is calculated for certain time Δt. The process proceeds to Operation S912.

At Operation S912, the vehicle behavior estimation device 100 determines whether the time when simulation is calculated is end time. The simulation control unit 103 ends the processing when the time when simulation is calculated is determined to be the end time, and otherwise the process proceeds to Operation S901.

At Operation S905, the vehicle behavior estimation device 100 determines how much vehicle state data at the time of calculating the vehicle model satisfies the restriction conditions, and outputs the determination result.

At Operation S906, the vehicle behavior estimation device 100 deletes a vehicle model. The vehicle model calculation unit 102 deletes a vehicle model with the restriction conditions having passing time that matches with the time when simulation is calculated. The process proceeds to Operation S907.

Figure 10:
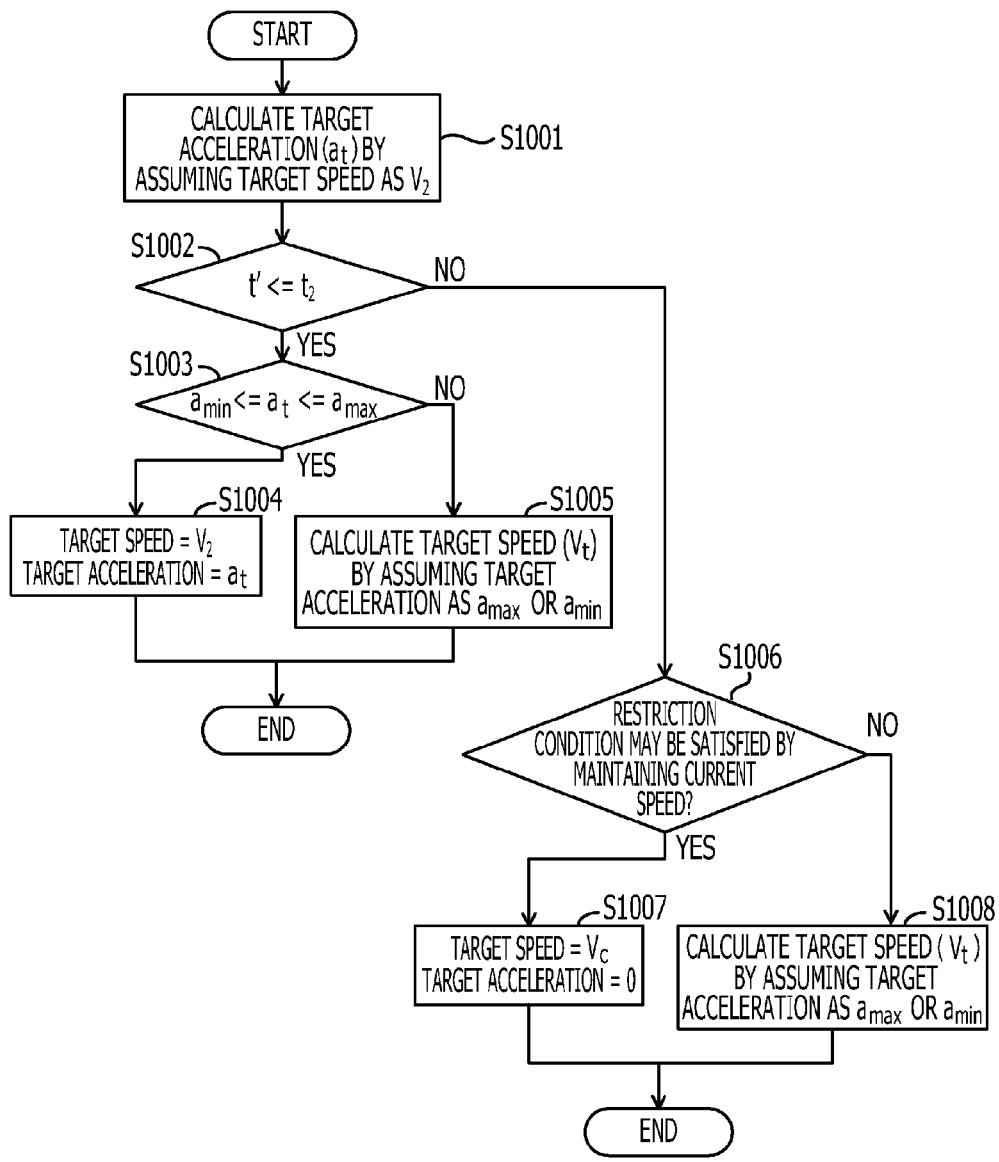
FIG. 10 is a flow chart of a vehicle behavior estimation device according to one embodiment.

FIG. 10 is a flow chart to describe Operation S908 more detail.

At Operation S1001, the vehicle behavior estimation device 100 calculates a target speed and target acceleration. The behavior parameter calculation unit 101 calculates target acceleration $a_t$ based on driving speed $v_t$ at the time of calculation by assuming a passing speed $v_2$ at the next observation point as a target speed.

Figure 11:
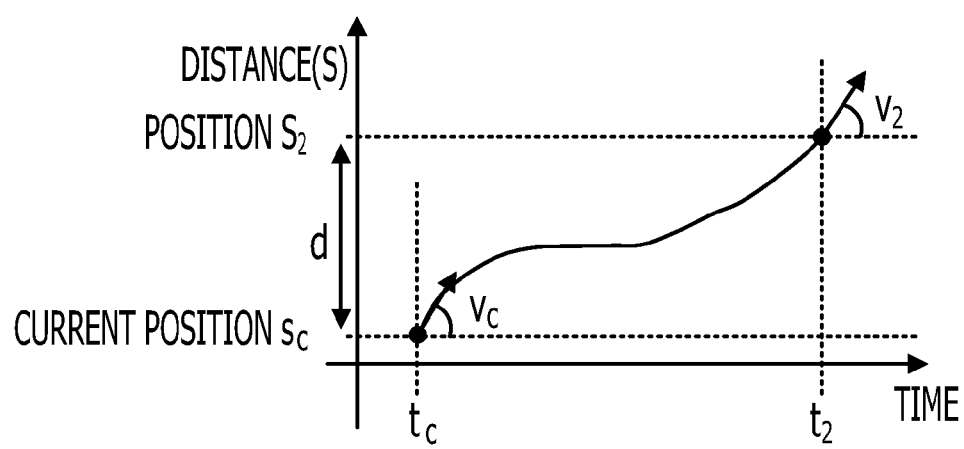
FIG. 11 illustrates a relationship between time and position of a vehicle model.

FIG. 11 illustrates change in speed of a vehicle from a position at the time of calculation until the vehicle reaches an observation point $s_2$.

In FIG. 11, the vertical axis indicates a distance, while the horizontal axis indicates time, and position information of a vehicle model is represented by a relative distance.

A position at the start of calculating a vehicle model is assumed to be $s_c$ and a speed at time $t_c$ at the start of calculation is assumed to be $v_c$. The restriction conditions are that the vehicle travels the observation point $s_2$ with a speed $v_2$ at time $t_2$.

When a distance from a position $s_c$ at the start of calculation to the next observation point $s_2$ is d, a target speed $v_t$ and target acceleration $a_t$ at the position $s_c$ at the start of calculation are represented by the expressions below.

Target speed $v_t = v_2$ (1)

Target acceleration $a_t = (v_2 - v_c)/(t' - t_c)$ (2)

Here, time when the speed of the vehicle model reaches the speed $v_2$ is reach time t'. The reach time t' is represented by the following expression.

$t' = (2d - 2v_2 t_2 + v_2 t_c + v_c t_c)/(v_c - v_2)$ (where, $t_c < t' < t_2$) (3)

At Operation S1002, the vehicle behavior estimation device 100 determines whether the reach time t' is equal to or less than time $t_2$. The behavior parameter calculation unit 101 proceeds to Operation S1003 when the calculated reach time t' does not exceed time $t_2$ that is a next restriction condition. The behavior parameter calculation unit 101 proceeds to Operation S1006 when the calculated reach time t' exceeds time $t_2$ that is the next restriction condition.

At Operation S1003, the vehicle behavior estimation device 100 determines whether target acceleration $a_t$ is, or greater than a substantially maximum deceleration $a_{min}$ and is, or less than substantially maximum acceleration $a_{max}$. The substantially maximum deceleration $a_{min}$ and the substantially maximum acceleration $a_{max}$ are set for behavior of normal driving of the vehicle. The behavior parameter calculation unit 101 determines the target acceleration $a_t$ is within a range between the substantially maximum deceleration $a_{min}$ and the substantially maximum acceleration $a_{max}$. Here, the normal substantially maximum acceleration $a_{max}$ is, for example, 2 m/s², and the normal substantially maximum deceleration $a_{min}$ is, for example, −2 m/s². The behavior parameter calculation unit 101 proceeds to Operation S1004 when the target acceleration $a_t$ is within a range between the substantially maximum deceleration $a_{min}$ and the substantially maximum acceleration $a_{max}$ and otherwise proceeds to Operation S1005.

The behavior parameter calculation unit 101 sets a target speed $v_t$ to a passing speed $v_2$ at time $t_2$ as in the expression (1), calculates reach time t' according to the expression (3), and calculates target acceleration $a_t = (v_2 - v_c)/(t' - t_c)$ according to the expression (2).

Figure 12:
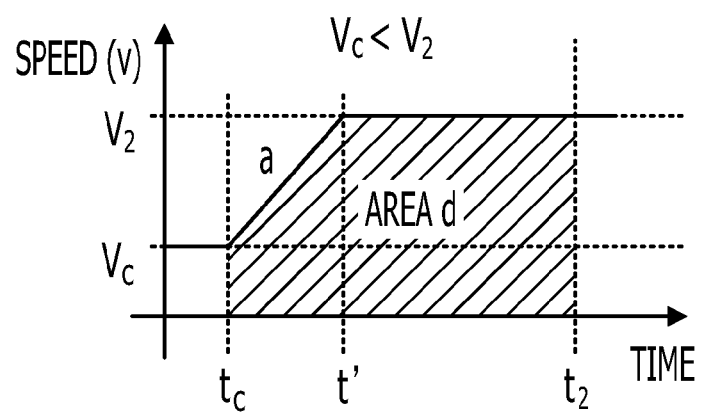
FIG. 12 illustrates a relationship between time and position of a vehicle model.

FIG. 12 illustrates a method to calculate reach time t' when the speed $v_c$ at the start of calculation is less than the target speed $v_2$.

In FIG. 12, the vertical axis represents the speed of the vehicle model, while the horizontal axis represents time. In this case, a gradient between the two points is acceleration, while an area obtained by integrating driving speed between two time periods is a driving distance.

As illustrated in FIG. 12, when the speed $v_c$ at the start of calculation is less than the target speed $v_2$ and reaches the target speed $v_2$ before the time $t_2$, the acceleration "a" from the time $t_c$ at the start of calculation until the reach time t' is a positive value.

The behavior parameter calculation unit 101 calculates an area that is under a straight line of a gradient "a" when a vehicle travels with an acceleration "a" from time $t_c$ at the start of calculation to reach time t'. The behavior parameter calculation unit 101 calculates a rectangular area when the vehicle travels with speed $v_2$ from the reach time t' to time $t_2$. The behavior parameter calculation unit 101 determines the reach time t' so that a sum of the areas corresponds to a distance "d."

The behavior parameter calculation unit 101 calculates target acceleration $a_t$ by the expression (2) after calculating the reach time t'. At this time, the target acceleration $a_t$ calculated by the behavior parameter calculation unit 101 corresponds to a gradient "a" in FIG. 12.

Figure 13:
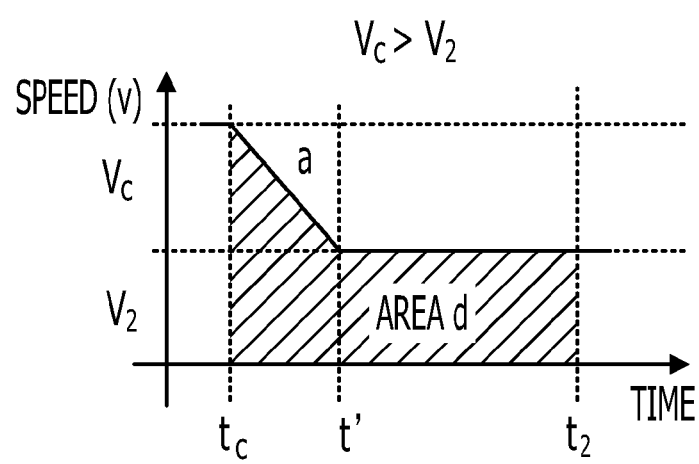
FIG. 13 illustrates a relationship between time and position of a vehicle model.

FIG. 13 illustrates a method to calculate the reach time t' if speed $v_c$ at the start of calculation is greater than the target speed $v_2$.

In FIG. 13, as in FIG. 12, the vertical axis represents a speed of the vehicle model, while the horizontal axis represents time. In this case, a gradient between two points is acceleration, while an area obtained by integrating driving speed between two time points corresponds to a driving distance.

As illustrated in FIG. 13, acceleration "a" from time $t_c$ at the start of calculation to reach time t' has a negative value when the speed $v_c$ at the start of calculation is greater than the target speed $v_2$ and reaches the target speed $v_2$ earlier than the time $t_2$.

The behavior parameter calculation unit 101 calculates an area under a straight line of a gradient "a" when a vehicle travels at acceleration "a" from time $t_c$ at the start of calculation to reach time t'. The behavior parameter calculation unit 101 calculates a rectangular area when the vehicle travels with speed $v_2$ from the reach time t' to time $t_2$. The behavior parameter calculation unit 101 determines the reach time t' so that a sum of the areas corresponds to a distance d.

The behavior parameter calculation unit 101 calculates target acceleration $a_t$ by the expression (2) after calculating the reach time t'. At this time, the target acceleration $a_t$ calculated by the behavior parameter calculation unit 101 corresponds to a gradient "a" in FIG. 13.

At Operation S1005, the vehicle behavior estimation device 100 sets target acceleration to substantially maximum acceleration and a value greater than a passing speed at the next observation point as a target speed. Alternatively, the vehicle behavior estimation device 100 sets target acceleration to substantially maximum deceleration and a value less than the passing speed at the next observation point as a target speed.

The behavior parameter calculation unit 101 determines the vehicle may not reach the observation point $s_2$ at the next passing time $t_2$ even the speed reaches the target speed $v_2$ with the substantially maximum acceleration $a_{max}$ when the behavior parameter calculation unit 101 determines the target acceleration $a_t$ calculated at Operation S1001 is greater than the normal substantially maximum acceleration $a_{max}$. Moreover, the behavior parameter calculation unit 101 determines the vehicle goes beyond the observation point $s_2$ at the next passing time $t_2$ when the behavior parameter calculation unit 101 determines the target acceleration $a_t$ calculated at Operation S1001 is less than the normal substantially maximum deceleration $a_{min}$. When the target acceleration $a_t$ calculated at Operation S1001 is less than the normal substantially maximum deceleration $a_{min}$, decelerating with the target acceleration $a_t$ results in behavior that significantly deviates from actual behavior, therefore estimation is made by decelerating with the substantially maximum deceleration $a_{min}$. The behavior parameter calculation unit 101 determines the vehicle goes beyond the observation point $s_2$ at the next passing time $t_2$ even if the speed reaches the target speed $v_2$ with the substantially maximum deceleration $a_{min}$.

The behavior parameter calculation unit 101 sets a target speed $v_t$ that is greater than the next passing speed $v_2$ by setting a target acceleration $a_t$ to the substantially maximum acceleration $a_{max}$ when the behavior parameter calculation unit 101 determines the vehicle may not reach the observation point $s_2$ at the next passing time $t_2$. Moreover, the behavior parameter calculation unit 101 sets target acceleration $a_t$ to substantially maximum deceleration $a_{min}$ and a value less than the next passing speed $v_2$ as a target speed $v_t$ when the behavior parameter calculation unit 101 determines the vehicle goes beyond the observation point $s_2$ at the next passing time $v_2$.

Figure 14:
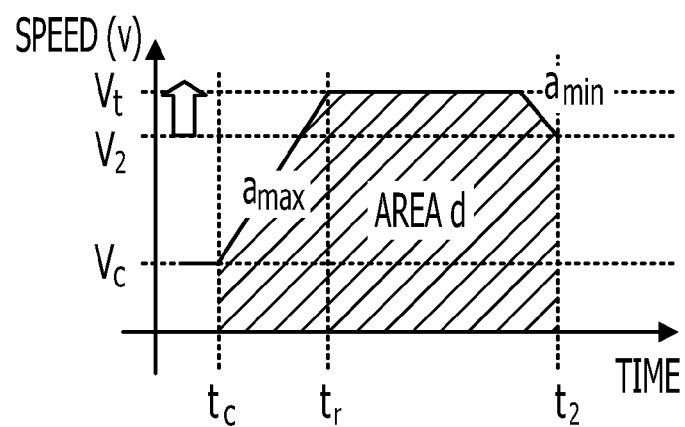
FIG. 14 illustrates a relationship between time and position of a vehicle model.

FIG. 14 illustrates calculating behavior parameters when the target acceleration $a_t$ calculated at Operation S1001 exceeds the normal substantially maximum acceleration $a_{max}$.

FIG. 14 illustrates a case in which the vehicle may not reach the observation point $s_2$ by next passing time $t_2$ even if the speed $v_c$ at $t_c$ at the start of calculation is accelerated with the substantially maximum acceleration $a_{max}$ until the speed reaches the passing speed $v_2$ at the next observation point $s_2$.

In this case, the behavior parameter calculation unit 101 sets behavior parameters so that the speed is accelerated with the substantially maximum acceleration $a_{max}$ to the target speed $v_t$ that is greater than the passing speed $v_2$ at the next observation point $s_2$.

The target speed $v_t$ may be calculated according to the expressions below when time that reaches the target speed $v_t$ that is greater than the next passing speed $v_2$ is assumed to be the reach time $t_r$:

$$t_r = t_c + (v_t - v_c)/a_{max} \text{ (where } t_r < t_2) \quad (4)$$

$$(t_2 - t_r)v_t + (v_c + v_t)(t_r - t_c)/2 = d \quad (5)$$

Note that $v_{min} < v_t < v_{max}$ when the upper speed limit is $v_{max}$ and the lower speed limit is $v_{min}$. Usually, the upper speed limit, $v_{max}$ is regulatory or legal speed and the lower speed limit $v_{min}$ is lower limit to drive the vehicle.

Time that takes to change the speed $v_t$ to the next passing speed $v_2$ is assumed to be 0 for convenience of calculation. However, as illustrated in FIG. 14, the target speed $v_t$ may be calculated by taking account of time that is needed to change from the target speed $v_t$ with the substantially maximum deceleration $a_{min}$ to the next passing speed $v_2$. Calculating deceleration to decelerate from the target speed $v_t$ to the next passing speed $v_2$ may be performed as calculating behavior parameters after the reach time $t_r$.

In this case, an area that is under a straight line of a gradient $a_{max}$, where the gradient indicates the speed is accelerated from the speed $v_c$ at time $t_c$ at the start of calculation to the target speed $v_t$ at the reach time $t_r$, is added to a value of a rectangular area, where the vehicle travels with the target speed $v_t$ from the reach time $t_r$ to the next passing time $t_2$. The sum of the areas corresponds to a distance "d" from the position $s_c$ at the start of calculation to the next observation point $s_2$.

Figure 15:
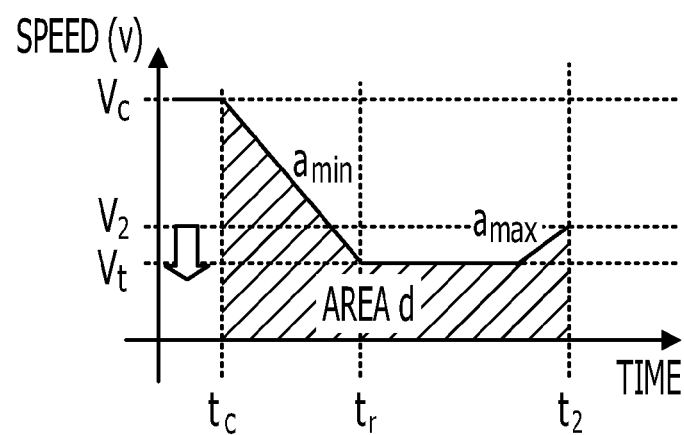
FIG. 15 illustrates a relationship between time and position of a vehicle model.

FIG. 15 illustrates a method to calculate behavior parameters when the target acceleration $a_t$ is less than the normal substantially maximum deceleration $a_{min}$.

FIG. 15 illustrates a case in which the vehicle goes beyond the observation point $s_2$ even if the speed is decelerated from the speed $v_c$ at time $t_c$ when calculation is started with substantially maximum deceleration $a_{min}$ until the speed reaches the passing speed $v_2$ at the next observation point $s_2$.

In this case, the behavior parameter calculation unit 101 sets behavior parameters so that the speed is decelerated with substantially maximum deceleration $a_{min}$ until the speed reaches the target speed $v_2$ that is less than the passing speed $v_t$ at the observation point $s_2$.

The target speed $v_t$ may be calculated according to the expressions below when time that reaches target speed $v_t$ that is less than the next passing speed $v_2$ is assumed to be reach time $t_r$:

$$t_r = t_c + (v_t - v_c)/a_{min} \text{ (where } t_r < t_2) \quad (6)$$

$$(t_2 - t_r)v_t + (v_c + v_t)(t_r - t_c)/2 = d \quad (7)$$

Note that $v_{min} < v_t < v_{max}$ when the upper speed limit is $v_{max}$ and the lower speed limit is $v_{min}$. Usually, the upper speed limit, $v_{max}$ is a regulatory or legal speed and the lower speed limit $v_{min}$ is lower limit to drive the vehicle.

Here, time that takes to change speed $v_t$ to the next passing speed $v_2$ is assumed to be 0 for convenience of calculation as well. However, as illustrated in FIG. 15, the target speed $v_t$ may be calculated by taking account of time that is needed to change from the target speed $v_t$ with the substantially maximum acceleration $a_{max}$ to the next passing speed $v_2$. Calculating acceleration to accelerate from the target speed $v_t$ to the next passing speed $v_2$ may be performed as calculating behavior parameters after the reach time $t_r$.

The gradient $a_{min}$ in FIG. 15 indicates the speed is decelerated from the speed $v_c$ at time $t_c$ at the start of calculation to the target speed $v_t$ at the reach time $t_r$. An area that is under a straight line of the gradient $a_{min}$ is added to a value of a rectangular area where the vehicle travels from the reach time $t_r$ to the passing time $t_2$ with the target speed $v_t$. The sum of the areas corresponds to a distance "d" from the position $s_c$ where calculation is started to the next observation point $s_2$.

At Operation S1006, the vehicle behavior estimation device 100 determines whether the restriction conditions are satisfied by maintaining the speed at the start of calculation.

When the reach time t' calculated at Operation S1001 exceeds the next passing time $t_2$, starting accelerating the speed with the target acceleration $a_t$ at time $t_c$ at the start of calculation makes the vehicle goes beyond the observation point $s_2$ at the next passing time $t_2$. The behavior parameter calculation unit 101 determines whether the vehicle passes the observation point $s_2$ at the passing time $t_2$ which is the restriction condition when the speed $v_c$ at the start of calculation is maintained for a certain time period and starts accelerating the speed with the target acceleration $a_t$. The process proceeds to Operation S1007 when the behavior parameter calculation unit 101 determines the restriction condition is satisfied by maintaining the speed $v_c$ at the start of calculation for a certain time period, and otherwise proceeds to Operation S1008.

At Operation S1007, the vehicle behavior estimation device 100 sets the target acceleration to 0 by assuming the target speed as the speed at the start of calculation.

As described above, the behavior parameter calculation unit 101 sets target speed $v_t$=speed $v_c$ at the start of calculation, sets the target acceleration $a_t$=0, and maintains the speed $v_c$ for a certain period so as not to accelerate immediately.

Figure 16:
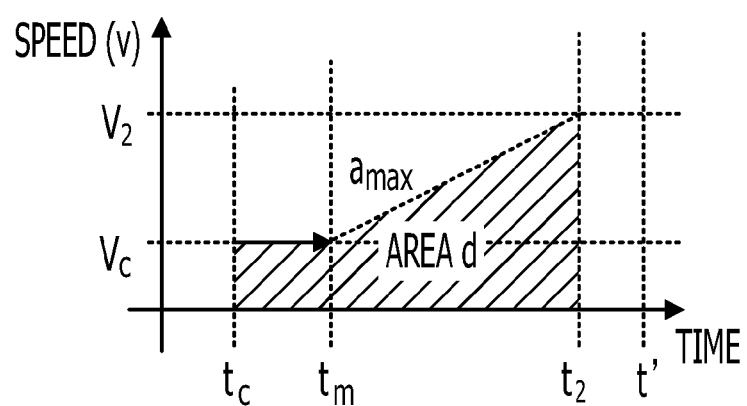
FIG. 16 illustrates a relationship between time and position of a vehicle model.

FIG. 16 illustrates setting target acceleration when the restriction conditions are satisfied by maintaining the speed at the start of calculation and a value of speed at the start of calculation is less than a value of the next passing speed.

When the speed $v_c$ at the start of calculation is less than a value of the next passing speed $v_2$, the behavior parameter calculation unit 101 determines to maintain the speed $v_c$ at the start of calculation until the time $t_m$ and starts accelerating the speed with the substantially maximum acceleration $a_{max}$ from time $t_m$.

An area "d" illustrated in FIG. 16 is a sum of a rectangular area when the vehicle travels with the speed $v_c$ at time $t_c$ at the start of calculation to time $t_m$ and an area under a straight line of a gradient "a" when the speed is accelerated with the target acceleration $a_t$=substantially the maximum acceleration $a_{max}$. The behavior parameter calculation unit 101 calculates time $t_m$ so that the area "d" corresponds to a distance "d" between the position $s_c$ at the start of calculation to the next observation point $s_2$. The expression below may be used to calculate time $t_m$.

$$t_m = t_2 - (v_2 - v_c)/a_{max} \quad (8)$$

The behavior parameter calculation unit 101 may prevent the vehicle from going beyond the observation point $s_2$ at the next passing time $t_2$ by setting target speed $v_t$=speed $v_c$ at the start of calculation, and target acceleration $a_t$=0, and maintaining the state until time $t_m$.

The behavior parameter calculation unit 101 may not calculate time $t_m$ to maintain the speed $v_c$ at the start of calculation because the behavior parameter calculation unit 101 calculates behavior parameters at a substantially constant time interval.

Figure 17:
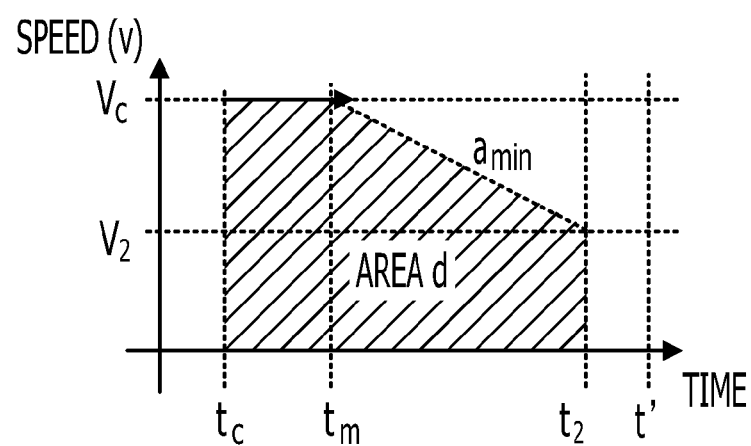
FIG. 17 illustrates a relationship between time and position of a vehicle model.

FIG. 17 illustrates setting target acceleration when the restriction conditions are satisfied by maintaining the speed at the start of calculation and a value of speed at the start of calculation is greater than a value of the next passing speed.

When the speed $v_c$ at the start of calculation is greater than a value of the next passing speed $v_2$, the behavior parameter calculation unit 101 determines to maintain the speed $v_c$ at the start of calculation until the time $t_m$ and starts decelerating the speed with the substantially maximum deceleration $a_{min}$ from time $t_m$.

An area "d" illustrated in FIG. 17 is a sum of a rectangular area when the vehicle travels with the speed $v_c$ at time $t_c$ at the start of calculation to time $t_m$ and an area under a straight line of a gradient "a" when the speed is decelerated with the target acceleration $a_t$=substantially the maximum deceleration $a_{min}$. The behavior parameter calculation unit 101 calculates time $t_m$ so that the area "d" corresponds to a distance "d" between the position $s_c$ at the start of calculation to the next observation point $s_2$. The expression below may be used to calculate time $t_m$.

$$t_m = t_2 - (v_2 - v_c)/a_{min} \quad (9)$$

The behavior parameter calculation unit 101 may prevent the vehicle from going beyond the observation point $s_2$ at the next passing time $t_2$ by setting target speed $v_t$=speed $v_c$ at the start of calculation and target acceleration $a_t$=0, and maintaining the state until time $t_m$.

The behavior parameter calculation unit 101 may not calculate time $t_m$ to maintain speed $v_c$ at the start of calculation because the behavior parameter calculation unit 101 calculates behavior parameters at a substantially constant time interval.

At Operation S1008, the vehicle behavior estimation device 100 sets the target speed less than the speed at the start of calculation when the speed at the start of calculation is less than a value of the next passing speed. Moreover, the vehicle behavior estimation device 100 sets the target speed greater than the speed at the start of calculation when the speed at the start of calculation is greater than a value of the next passing speed.

Figure 18:
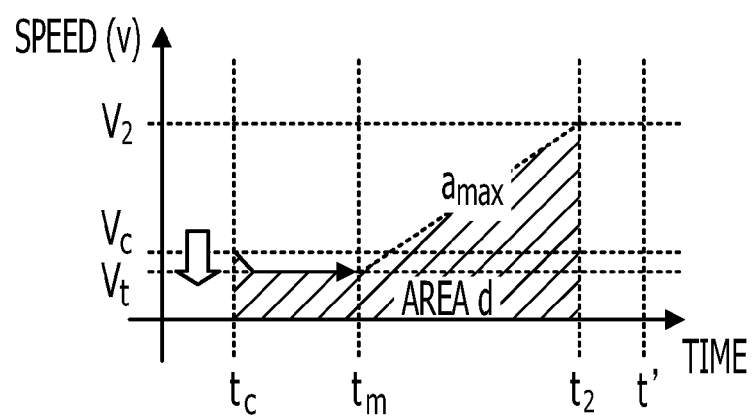
FIG. 18 illustrates a relationship between time and position of a vehicle model.

FIG. 18 illustrates setting behavior parameters when the restriction conditions are not satisfied even if a speed at the start of calculation is maintained for a certain time period and speed at the start of calculation is less than the next passing speed.

When the speed $v_c$ at the start of calculation $v_c$ is less than the next passing speed $v_2$, the vehicle may go beyond the observation point $s_2$ at next passing time $t_2$ even if the speed at the start of calculation $v_c$ is maintained for a certain time period and is started to accelerate with the substantially maximum acceleration $a_{max}$. In this case, the behavior parameter calculation unit 101 sets the target speed $v_t$ to a value less than the speed $v_c$ at the start of calculation. In other words, when a speed at time $t_m$ illustrated in FIG. 16 is $v_m$ and the inequality below is satisfied, the target speed $v_t$ that is less than the speed $v_c$ at the start of calculation is set.

$$d < v_c(t_m - t_c) + (v_c + v_2)(t_2 + v_m) \quad (10)$$

In this case, the behavior parameter calculation unit 101 sets the target acceleration $a_t$ to the substantially maximum deceleration $a_{min}$ and calculates the target speed $v_t$ by the expression below.

$$t_m = t_2 - (v_2 - v_t)/a_{max} \text{ (where } t_m > t_c) \quad (11)$$

$$(t_m - t_c)v_t + (v_t + v_2)(t_2 - t_m)/2 = d \quad (12)$$

Note that $v_{min} < v_t < v_{max}$ when the upper speed limit is $v_{max}$ and the lower speed limit is $v_{min}$. Usually, the upper speed limit, $v_{max}$ is a regulatory or legal speed and the lower speed limit $v_{min}$ is lower limit to drive the vehicle.

Here, time that takes to change the speed $v_c$ at the start of calculation to the target speed $v_t$ is assumed to be 0 for convenience of calculation. However, the target speed $v_t$ may be calculated by taking account of time that takes to change from the speed $v_c$ at the start of calculation with the substantially maximum deceleration $a_{min}$ to reach the target speed $v_t$.

In this case, the area "d" in FIG. 18 is a sum of a rectangular area when the vehicle travels from time $t_c$ at the start of calculation to time $t_m$ with target speed $v_t$ and an area under a straight line of a gradient "$a_{max}$" when the speed is accelerated with the substantially maximum acceleration "$a_{max}$" from the target speed $v_t$ at time $t_m$ to the passing speed $v_2$ at time $t_2$. The sum of the areas corresponds to a distance "d" between a position $s_c$ at the start of calculation and the next observation point $s_2$.

Figure 19:
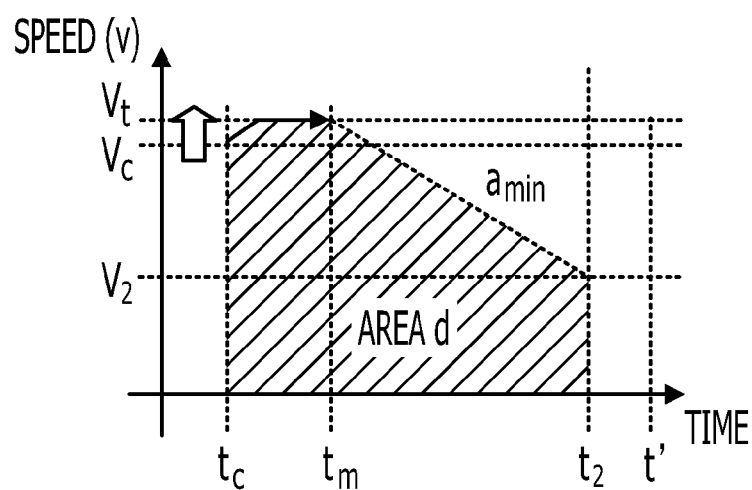
FIG. 19 illustrates a relationship between time and position of a vehicle model.

FIG. 19 illustrates setting behavior parameters when the restriction conditions are not satisfied even if the speed at the start of calculation is maintained for a certain period and a speed at the start of calculation is greater than the next passing speed.

When the speed $v_c$ at the start of calculation is greater than the next passing speed $v_2$, the vehicle may go beyond a point $s_2$ at next passing time $t_2$ even if the speed $v_c$ at the start of calculation is maintained for a certain time period and decelerated at substantially maximum deceleration $a_{min}$. In this case, the behavior parameter calculation unit 101 sets the target speed $v_t$ to a value greater than the speed $v_c$ at the start of calculation. In other words, when a speed at time $t_m$ illustrated in FIG. 17 is a speed $v_m$ and the following inequality is satisfied, the target speed $v_t$ that is greater than the speed $v_c$ at the start of calculation is set.

$$d > v_c(t_m - t_c) + (v_c + v_2)(t_2 + v_m)/2 \quad (13)$$

The behavior parameter calculation unit 101 calculates the target speed $v_t$ according to the following expressions by setting the target acceleration $a_t$ to the substantially maximum deceleration $a_{min}$.

$$t_m = t_2 - (v_2 - v_t)/a_{min} \text{ (where, } t_m > t_c) \quad (14)$$

$$(t_m - t_c)v_t + (v_t + v_2)(t_2 - t_m)/2 = d \quad (15)$$

Note that $v_{min} < v_t < v_{max}$ when the upper speed limit is $v_{max}$ and the lower speed limit is $v_{min}$. Usually, the upper speed limit $v_{max}$ is a regulatory or legal speed and the lower speed limit $v_{min}$ is lower limit to drive the vehicle.

Here, time that takes to change speed $v_c$ at the start of calculation to the target speed $v_t$ is assumed to be 0 for convenience of calculation. However, the target speed $v_t$ may be calculated by taking account of time that takes the speed $v_c$ at the start of calculation with the substantially maximum acceleration $a_{max}$ to reach the target speed $v_t$.

In this case, a rectangular area when the vehicle travels from time $t_c$ at the start of calculation to time $t_m$ with target speed $v_t$ is added to an area under a straight line of a gradient $a_{min}$ when the target speed $v_t$ at time $t_m$ is accelerated with substantially maximum deceleration $a_{min}$ to the passing speed $v_2$ at passing time $t_2$. The sum of the areas corresponds to a distance "d" between a position $s_c$ at the start of calculation and the next observation point $s_2$.

As described above, when the restriction conditions are not satisfied even if the speed is decelerated or accelerated with the substantially maximum deceleration $a_{min}$ or the substantially maximum acceleration $a_{max}$, the behavior parameter calculation unit 101 calculates behavior parameters so as to start accelerating the speed with target acceleration after maintaining the speed $v_c$ at the start of calculation for a certain time period.

There may be a case in which the restriction conditions are not satisfied even if a speed at the start of calculation is maintained for a certain time period and accelerated with target acceleration. In this case, behavior parameters are determined so as to satisfy the restriction conditions by accelerating the speed $v_c$ at the start of calculation with the target acceleration that is opposite to acceleration applied from the speed $v_c$ at the start of calculation to the next passing speed $v_2$.

Deviation from Assumed Vehicle Behavior

The vehicle behavior estimation device 100 determines behavior of a vehicle model based on influence by the behavior of another vehicle model that travels in front of the vehicle, avoiding collision with obstacles, traffic rules such as stopping at traffic signals and stop lines, and other traffic environments.

For example, as described above, the driver model calculation unit 105 of the vehicle model calculation unit 102 calculates values to operate steering and acceleration and brake operations based on traffic environments such as a target route, physical shape of a road, traffic rules, traffic signs, and vehicle state data of a vehicle model that is present nearby, selecting a driving lane, and compliance with stop signs such as signals, railroad crossing, and stop control. The vehicle movement model calculation unit 106 models physical behavior of the vehicle body according to vehicle behavior output by the driver model calculation unit 105, and outputs vehicle state data obtained from the model. Accordingly, behavior estimated by the behavior parameters calculated by the behavior parameters calculation unit 101 and behavior controlled by the vehicle model calculation unit 102 do not necessarily match.

The behavior parameter calculation unit 101 calculates behavior parameters so as to satisfy the restriction condition as required even when behavior of the vehicle model deviates from the behavior assumed by the behavior parameter calculated by the behavior parameter calculation unit 101.

Figure 20:
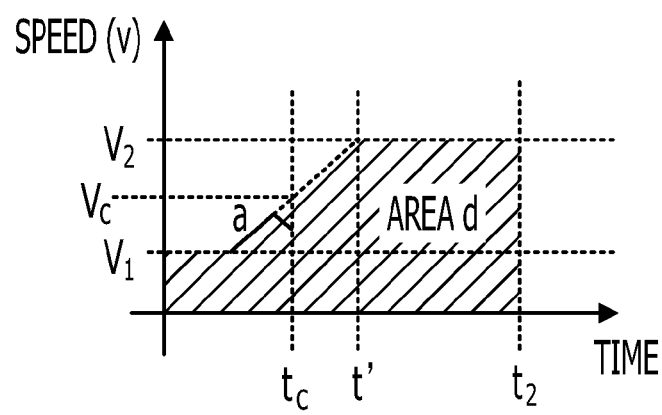
FIG. 20 illustrates a relationship between time and position of a vehicle model.
Figure 21:
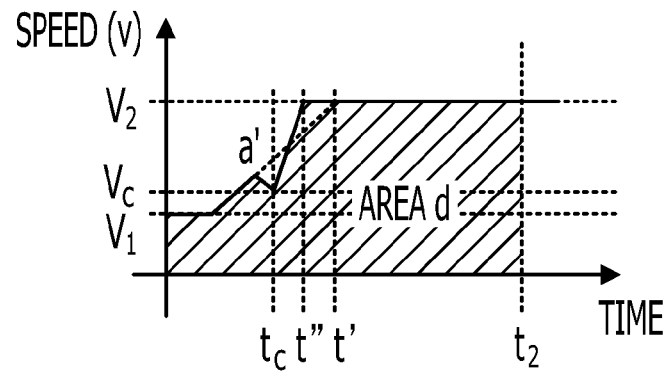
FIG. 21 illustrates a relationship between time and position of a vehicle model.

FIGS. 20 and 21 illustrate how to change behavior parameters when behavior assumed by the behavior parameters deviates from behavior of the vehicle model.

As illustrated in FIG. 20, the driving speed $v_c$ at time $t_c$ at the start of calculation deviates from behavior estimated by the behavior parameter calculated by the behavior parameter calculation unit 101 when the passing speed $v_1$ is accelerated with target acceleration "a" by setting the next passing speed $v_2$ as the target speed $v_t$, and the speed is decelerated due to influence of surrounding traffic environments.

In this case, the behavior parameter calculation unit 101 calculates target acceleration a' in order to reach target speed $v_t$ ($=v_2$) from driving speed $v_c$ at time $t_c$ at the start of calculation.

When the speed is accelerated with target acceleration "a" before deceleration is caused, time when driving speed $v_c$ of the vehicle model reaches target speed $v_2$ is reach time t'. In this case, the reach time t' is determined according to a distance from the observation point $s_1$ to the next observation point $s_2$ and an area obtained by integrating the driving speed corresponds to the distance "d."

On the other hand, the driving speed $v_c$ at time $t_c$ at the time of calculation is slower than the speed that is constantly accelerated by target acceleration "a" and the area obtained by integrating driving speed is smaller than the distance "d." Therefore, the vehicle does not reach the observation point $s_2$ at the next passing time $t_2$ even when the target acceleration "$a_t$" from the driving speed $v_c$ at time $t_c$ at the time of calculation is set to the target acceleration "a" that is calculated before deceleration is caused. Moreover, the vehicle does not reach the observation point $s_2$ at the next passing time $t_2$ even when target acceleration "$a_t$" from the driving speed $v_c$ at time $t_c$ at the time of calculation is calculated by using reach time $t_c$ to the target speed $v_2$ that is calculated before the deceleration is caused.

Thus, the behavior parameter calculation unit 101 calculates reach time t" when the driving speed $v_c$ at time $t_c$ at the time of calculation reaches the target speed $v_2$ so that the area obtained by integrating driving speed matches with the distance d and calculates target acceleration a' as a behavior parameter based on the calculated reach time t".

The vehicle model calculation unit 102 determines, through the driver behavior model calculation unit 105 and the vehicle body movement model calculation unit 106, vehicle behavior within a range that complies with traffic rules, surrounding traffic environments, and physical laws of the vehicle body.

Accordingly, behavior parameters are updated within a range that complies with traffic rules, surrounding traffic environments, and physical laws of the vehicle body even when behavior of the vehicle model deviates from the target speed and target acceleration due to influence of surrounding traffic environments.

Another Example of Behavior Parameters

Observation data detected by the vehicle detection unit 801 may include passing lane information that indicates which of a plurality of lanes the vehicle travels when the vehicle passes an observation point.

Restriction conditions stored in the restriction condition storage unit 110 include the passing lane information detected by the vehicle detection unit 801 as a restriction condition.

The behavior parameter calculation unit 101 may output the passing lane information as a behavior parameter based on the restriction conditions stored in the restriction condition storage unit 110.

FIG. 22A illustrates observation data in a road with a plurality of lanes.

A case is assumed in which vehicle detection units (sensors) are installed at points $s_1$ and $s_2$ on a road of two lanes each way. As illustrated in FIG. 22A, a vehicle with a vehicle ID "A" travels the first lane with a driving speed $v_{1a}$ when the vehicle passes the point $s_1$ at time $t_{1a}$.

In this case, the sensor installed at the point $s_1$ detects passing time of the vehicle, the passing speed at that time, and the passing lane as observation data. Restriction conditions generated from the observation data is stored in the restriction condition storage unit 110.

Likewise, the vehicle with the vehicle ID "A" travels the second lane with a driving speed $v_{2a}$ when the vehicle passes the point $s_2$ at time $t_{2a}$.

In this case, the second sensor installed at the point $s_2$ detects passing time $t_{2a}$, the passing speed $v_{2a}$, and the passing lane as observation data of the vehicle with the vehicle ID "A." Restriction conditions generated from the observation data are stored in the restriction condition storage unit 110.

FIG. 23 illustrates a restriction condition table stored in the restriction condition storage unit 110.

A restriction condition table 2300 includes columns of a vehicle ID, a position, passing time, a passing speed and a passing lane and may store time when a vehicle passes an observation point, the speed at that time, and passing lane information for each vehicle.

The vehicle ID column stores a vehicle identification symbol to identify a vehicle. At observation, the same vehicle may be identified by a vehicle number, characteristic of the vehicle body, and a passage order. Accordingly, the vehicle ID column may include the same vehicle ID when restriction conditions are generated from observation data of the same vehicle.

The position column stores position coordinates of the observation point. When the restriction conditions are generated from the observation data, the position to be stored in the position column is where a sensor that detects the observation data is installed.

The columns of passing time and passing speed store time when a vehicle passes and the speed respectively. When restriction conditions are generated from the observation data, the conditions are set based on passing time when a vehicle passes where a sensor is and the speed at that time.

The column of passing lane stores passing lane information indicating a lane where a vehicle passes among a plurality of lanes on a road when the vehicle passes an observation point. When restriction conditions are generated from observation data, a condition set for the column of passing lane is set based on a driving lane detected by a sensor that identifies a driving lane.

In the example of FIG. 23, restriction conditions for a vehicle with a vehicle ID "A" are passing an observation point $s_1$ with a driving speed $v_{1a}$ at time $t_{1a}$ and passing the first lane at that time.

Moreover, in the example of FIG. 23, restriction conditions for the vehicle with the vehicle ID "A" are passing an observation point $s_2$ with a driving speed $v_{2a}$ at time $t_{2a}$ and passing the second lane at that time.

The behavior parameter calculation unit 101 calculates behavior parameters so as to satisfy restriction conditions stored in the restriction condition storage unit 110. For example, the behavior parameter calculation unit 101 calculates a target speed, target acceleration, and target lane information as behavior parameters and stores the calculated results in the behavior parameter storage unit 111.

Figure 24:
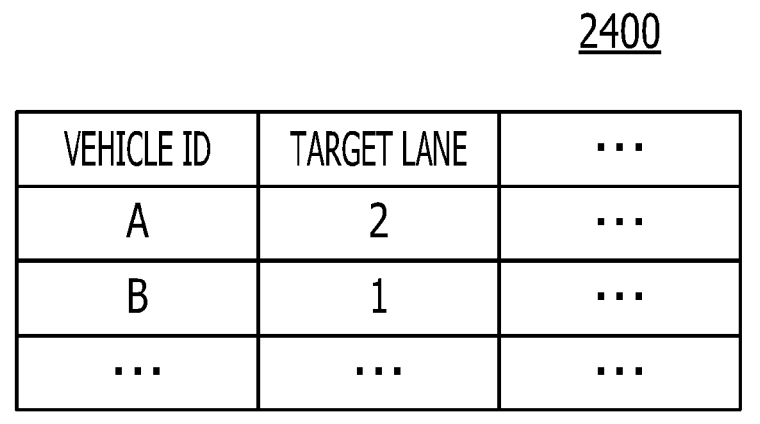

FIG. 24 illustrates an example of a behavior parameter table stored in the behavior parameter storage unit 111.

A behavior parameter table 2400 in FIG. 24 includes columns of a vehicle ID and a target lane.

The vehicle ID column stores a vehicle identification symbol to identify a vehicle.

The target lane column stores a lane where a vehicle passes at a next observation point as target lane information.

Although not illustrated in FIG. 24, the behavior parameter table 2400 may include a target speed column to store a target speed and a target acceleration column to store target acceleration.

The behavior parameter calculation unit 101 determines target lane information based on passing lane information at a next observation point $s_2$ and stores the information in the target lane information column of the behavior parameter table 2400.

In the illustrated example, restriction conditions for the vehicle with the vehicle ID "A" are passing the first lane at the observation point $s_1$ and passing the second lane at the observation point $s_2$. After the vehicle with the vehicle ID "A" passes the observation point $s_1$, the behavior parameter calculation unit 101 stores the second lane that is a passing lane at the next observation point $s_2$ in the behavior parameter table 2400 as target lane information.

The driver behavior model calculation unit 105 calculates driving behavior to change lanes based on the target lane information of the behavior parameter table 2400. The driver behavior model calculation unit 105 determines driving behavior by taking account of vehicle state data of surrounding vehicle models.

When the target lane information is different from a lane being driven at the start of calculation, the driver behavior model calculation unit 105 determines behavior of the vehicle by taking account of behavior of vehicle models that are driving ahead and back on the target lane.

FIG. 22B illustrates changing lanes of a vehicle model that corresponds to the vehicle with the vehicle ID "A."

FIG. 22B illustrates the vehicle model that corresponds to the vehicle with the vehicle ID "A" (hereinafter referred to as a vehicle model A) travels a point $s_3$. Here, a lane where the vehicle model A passes at the time of calculation is assumed to be a first lane and a lane where the vehicle model A passes at a point $s_2$ is assumed to be a second lane.

Around the vehicle model A, a vehicle model 2211 at the back part of the first lane, a vehicle model 2212 at the front part of the first lane, a vehicle model 2210 at the back part of the second lane, and a vehicle model 2213 at the front of the second lane are assumed to be present.

The driver behavior model calculation unit 105 determines whether the lane may be changed in order to satisfy the target lane information. The driver behavior model calculation unit 105 determines whether the lane may be changed according to a distance to the vehicle model 2210 at the back part of the second lane and a distance to the vehicle model 2213 at the front part of the second lane.

The driver behavior model calculation unit 105 determines an accelerator and brake pedal operation amount according to the target speed and the target acceleration by taking account of behaviors of other vehicle models when the driver behavior model calculation unit 105 determines that the lane may be changed.

Conditions to determine whether a lane may be changed may be included in behavior parameters stored in the behavior parameter storage unit 111.

Conditions to determine whether a lane may be changed may be alleviated in order to prioritize behavior to change a lane when passing lane information is included as a restriction condition.

As described above, vehicle behavior may be more accurately estimated by including target lane information in behavior parameters calculated by the behavior parameter calculation unit 101.

Restriction Condition Satisfaction State

The restriction condition satisfaction state output unit 802 calculates an error between vehicle state data of a vehicle model that passes an observation point and restriction conditions stored in the restriction condition storage unit 110 and outputs how much simulated vehicle state data satisfies the restriction conditions.

For example, the restriction condition satisfaction state output unit 802 may calculate an error between passing time and a passing speed when the vehicle model passes an observation point and the passing time and the passing speed of the restriction conditions stored in the restriction condition storage unit 110, and output the calculated error.

FIG. 25 illustrates an example of a restriction condition satisfaction state data table.

A restriction condition satisfaction state data table 2500 includes columns of a vehicle ID, a position, passing time, and a passing speed. The passing time column includes estimated data column, and the passing speed column includes an error column respectively.

The vehicle ID column stores a vehicle identification symbol to identify a vehicle and stores the same vehicle identification symbol as that in the vehicle ID column of the restriction condition table.

The position column stores position coordinates of an observation point. When restriction conditions are generated from observation data, the position column is for a position where a vehicle detection unit 801 that detects the vehicle is installed.

The estimated data column of the passing time column stores the passing time when a vehicle model passes an observation point. Moreover, the error column of the passing time column stores an error between passing time when the vehicle model passes an observation point and passing time included in the restriction conditions.

The estimated data column of the passing speed column stores a passing speed when a vehicle model passes an observation point. Moreover, the error column of the passing time column stores an error between a passing speed when the vehicle model passes an observation point and the passing speed included in the restriction conditions.

The restriction condition satisfaction state output unit 802 may determine whether an error of the passing time and an error of passing speed exceed thresholds, and may provided an alarm when any vehicle model exceeds the thresholds. For example, an alarm column may be provided in the restriction condition satisfaction state data table 2500 and may output an alarm display when there is any difference that exceeds the thresholds.

A Plurality of Restriction Conditions

The behavior parameter calculation unit 101 may calculate behavior parameters based on three or more restriction conditions stored in the restriction condition storage unit 110.

Figure 26:
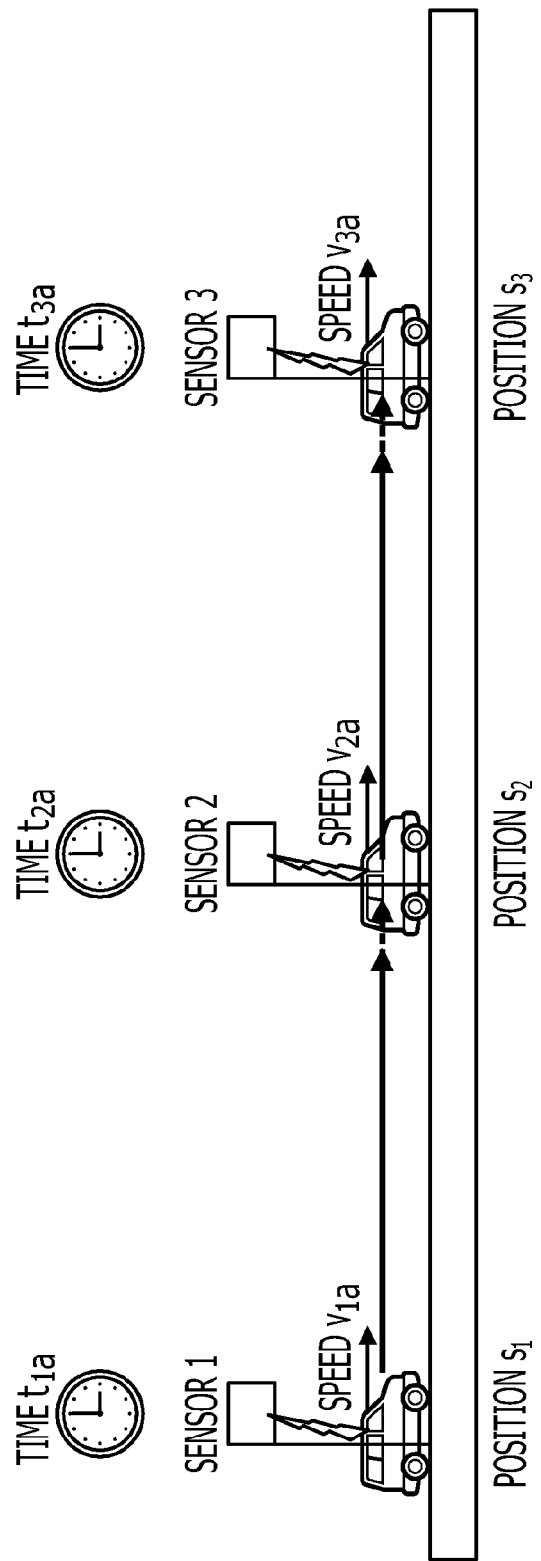
FIG. 26 illustrates observation data.

FIG. 26 illustrates observation data of vehicles.

As illustrated in FIG. 26, a vehicle with a vehicle ID "A" passes a point $s_1$ with a driving speed $v_{1a}$ at time $t_{1a}$.

In this case, a first sensor installed at the point $s_1$ detects passing time $t_{1a}$ and the passing speed $v_{1a}$ as observation data of the vehicle A. Restriction conditions generated from the observation data are stored in the restriction condition storage unit 110.

Likewise, a second sensor installed at a point $s_2$ detects passing time $t_{2a}$ and the passing speed $v_{2a}$ of the vehicle as observation data of the vehicle A when the vehicle with a vehicle ID "A" passes the point $s_2$ with driving speed $v_{2a}$ at time $t_{2a}$. Restriction conditions generated from the observation data are stored in the restriction condition storage unit 110.

Moreover, a third sensor installed at a point $s_3$ detects passing time of the vehicle $t_{3a}$ and the passing speed $v_{3a}$ as observation data when the vehicle with the vehicle ID "A" passes the point $s_3$ with driving speed $v_{3a}$ at time $t_{3a}$. Restriction conditions generated from the observation data are stored in the restriction condition storage unit 110.

FIG. 27 illustrates an example of a restriction condition table stored in the restriction condition storage unit 110.

A restriction condition table 2700 in FIG. 27 includes, as in the restriction condition table 400 illustrated in FIG. 6, columns of a vehicle ID, a position, passing time, and a passing speed and may store time when a vehicle passes an observation point and the speed for each vehicle.

The vehicle ID column stores a vehicle identification symbol to identify a vehicle. At observation, a vehicle may be identified, for example, by a vehicle number, characteristic of a vehicle body, and a passage order. Accordingly, the same vehicle ID may be included in restriction conditions when the restriction conditions are generated from observation data of the same vehicle.

The position column stores position coordinates of the observation point. When the restriction conditions are generated from the observation data, the position is where a sensor that detects the observation data is installed.

The columns of passing time and passing speed store time when a vehicle passes the observation point and the speed respectively. When restriction conditions are generated from the observation data, the conditions are set based on passing time when a vehicle passes where a sensor is, and the speed at that time.

In the illustrated example, the columns of passing time and passing speed store passing time and passing speed when the vehicle A passes the observation points $s_1$ to $s_3$.

Figure 28:
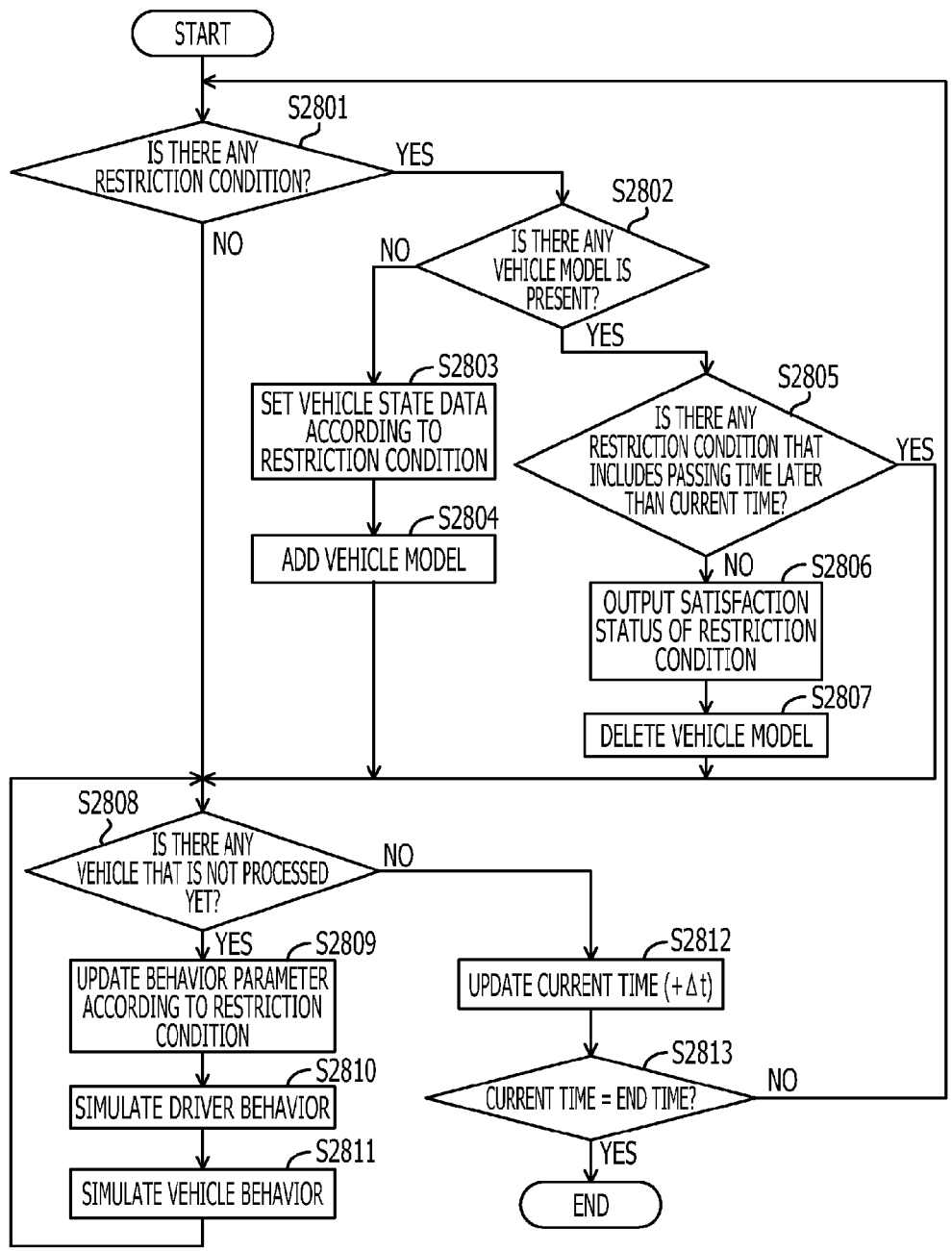
FIG. 28 is a flow chart when control is applied based on a plurality of restriction conditions.

FIG. 28 is a flow chart illustrating operation of the vehicle behavior estimation device 100 when behavior parameters are calculated based on three or more restriction conditions.

At Operation S2801, the vehicle behavior estimation device 100 determines whether there is any restriction condition having passing time that matches the time when simulation is calculated.

The simulation control unit 103 searches for restriction conditions stored in the restriction condition storage unit 110 and if there is any restriction condition having passing time that matches the time when simulation is calculated, the process proceeds to Operation S2802, and otherwise proceeds to Operation S2808.

At Operation S2802, the vehicle behavior estimation device 100 determines whether there is any vehicle model with the restriction condition having passing time that matches the time when simulation is calculated.

The simulation control unit 103 determines whether the restriction condition corresponds to a vehicle model controlled by the vehicle model calculation unit 102 and if the restriction condition does not correspond to the vehicle model, the process proceeds to Operation S2803, and if the restriction condition corresponds to the vehicle model, the process proceeds to Operation S2805.

At Operation S2803, the vehicle behavior estimation device 100 sets vehicle state data based on the restriction conditions. The vehicle model calculation unit 102 sets vehicle state data of a vehicle model that is newly provided based on the restriction conditions obtained from the restriction condition storage unit 110. When the restriction conditions stored in the restriction condition storage unit 110 include driving speed information when the vehicle passes an observation point, the position information and the driving speed information of the observation point are set as initial values.

At Operation S2804, the vehicle behavior estimation device 100 adds a new vehicle model. The vehicle model calculation unit 102 adds a new vehicle model the initial values of which satisfy the restriction conditions obtained from the restriction condition storage unit 110.

At Operation S2808, the vehicle behavior estimation device 100 determines whether there is any vehicle for which processing is not applied yet among vehicles for which simulation are to be applied.

Here, the vehicle behavior estimation device 100 determines whether vehicle state data when simulation is calculated is updated for the vehicle models controlled by the vehicle model calculation unit 102. As a result of determination if there is any vehicle model to which the processing is not applied yet, the process proceeds to Operation S2809, and if processing is applied to all of the vehicle models, the process proceeds to Operation S2812.

At Operation S2809, the vehicle behavior estimation device 100 updates behavior parameters based on the restriction conditions. The behavior parameter calculation unit 101 calculates a target speed and target acceleration based on the restriction conditions stored in the restriction condition storage unit 110 and vehicle state data at the time of calculation and stores the calculated results in the behavior parameter storage unit 111 as behavior parameters.

At Operation S2810, the vehicle behavior estimation device 100 simulates driving behavior of the driver of the vehicle. Here, the driver model calculation unit 105 simulates driving behavior of the driver based, for example, on surrounding traffic environment information and target route information. The simulation calculates driving behavior such as a steering operation amount, an accelerator and brake pedal operation amount based, at least, on the target speed and target acceleration calculated by the behavior parameter storage unit 111.

At Operation S2811, the vehicle behavior estimation device 100 simulates behavior of the vehicle body. Here, the vehicle body movement model calculation unit 106 simulates behavior of movement of the vehicle body based on the driving behavior calculated by the driver model calculation unit 105, and calculates vehicle state data based, for example, on a steering operation amount, an accelerator and brake pedal operation amount.

After that, the vehicle behavior estimation device 100 proceeds to Operation S2808 and updates vehicle state data for all of the vehicle models.

At Operation S2812, the vehicle behavior estimation device 100 updates time when simulation is calculated. The simulation control unit 103 increments the time when simulation is calculated for certain time Δt and the process proceeds to Operation S2813.

At Operation S2813, the vehicle behavior estimation device 100 determines whether time when simulation is calculated is end time. The simulation control unit 103 ends the processing if the simulation control unit 103 determines time at calculating the simulation is end time, and otherwise proceeds to Operation S2801.

At Operation S2805, the vehicle behavior estimation device 100 determines whether there is any restriction condition that includes passing time equal to or later than the time of calculation. The simulation control unit 103 searches for restriction conditions stored in the restriction condition storage unit 110 and if the simulation control unit 103 determines that there is a restriction condition that includes passing time that is equal to or later than the time of calculation, the process proceeds to Operation S2808, and otherwise proceeds to Operation S2806.

At Operation S2806, the vehicle behavior estimation device 100 determines how much vehicle state data when a vehicle model is calculated satisfies the restriction condition and outputs the determination result.

At Operation S2807, the vehicle behavior estimation device 100 updates the vehicle model. The vehicle model calculation unit 102 deletes a vehicle model with the restriction condition having passing time that matches the time when simulation is calculated and proceeds to Operation S2808.

As described above, the simulation control unit 103 searches the restriction condition storage unit 110 and if there is no information in which passing time of the restriction condition matches the time of calculation, the simulation control unit 103 adds a vehicle model the initial values of which satisfy the restriction conditions. Moreover, the simulation control unit 103 searches the restriction condition storage unit 110 and if there is information in which passing time of the restriction condition matches the time of calculation and the passing time of the restriction condition is equal to or later than the time of calculation, the simulation control unit 103 calculates behavior that satisfies the next restriction condition without adding a vehicle model.

According to the embodiment, if there is information in which passing time of the restriction condition is equal to or later than the time of calculation, the vehicle behavior is simulated by putting emphasis on continuity of behavior of the vehicle model without deleting the vehicle model at the passing time and adding a new vehicle model.

Other Embodiment

The driver model calculation unit 105 calculates driving behavior of the driver by observing surrounding traffic states, traffic signals, traffic rules, and other traffic environments.

Other than those described above, behavior parameters calculated by the behavior parameter calculation unit 101 may be desirably corrected according to the surrounding traffic environments. For example, whether a vehicle stops at a signalized intersection that is located ahead of the vehicle model influences how much the restriction condition is satisfied thereafter. Thus, the vehicle model is controlled so as to satisfy the restriction conditions by modifying the behavior parameters according to signal timing at the intersection located ahead to determine behavior of the vehicle model so as to pass the intersection without stopping or to stop at the intersection.

As one embodiment, a case in which behavior parameters are corrected based on traffic environment information is considered.

Figure 29:
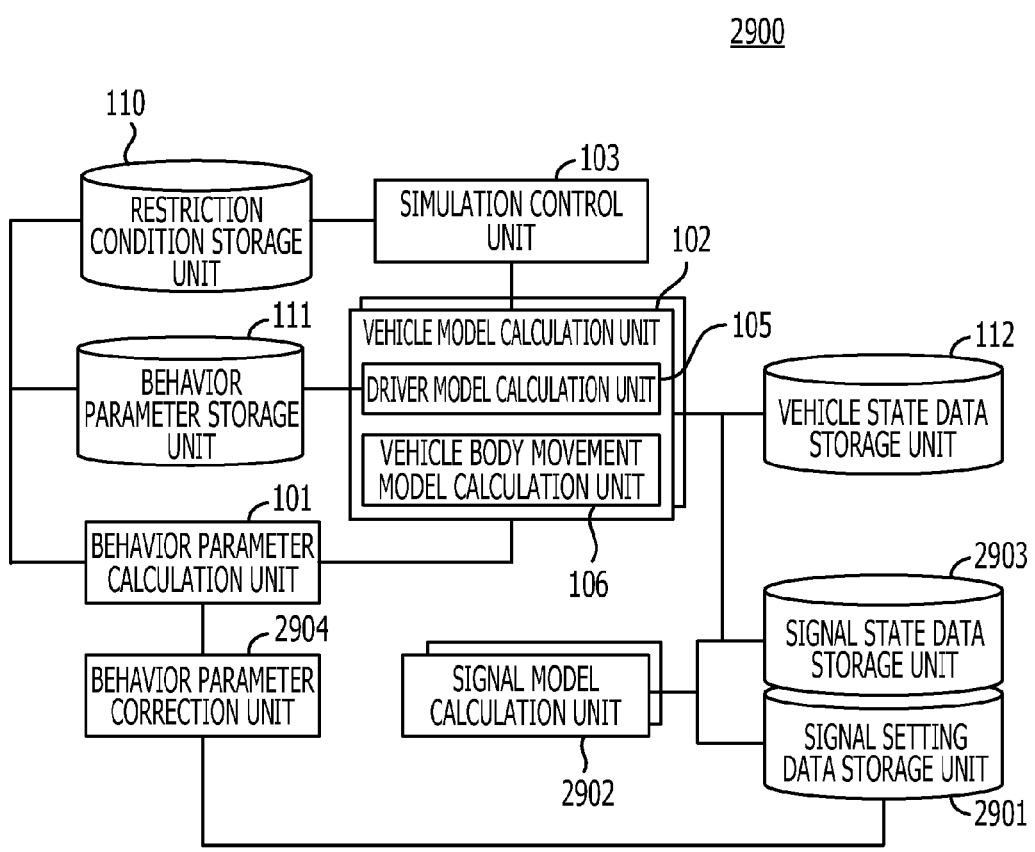
FIG. 29 is a functional block diagram illustrating a vehicle behavior estimation device according to one embodiment.

FIG. 29 is a functional block diagram illustrating a vehicle behavior estimation device according to one embodiment.

A vehicle behavior estimation device 100 includes a behavior parameter calculation unit 101, a vehicle model calculation unit 102, a simulation control unit 103, a restriction condition storage unit 110, a behavior parameter storage unit 111, and a vehicle state data storage unit 112.

The vehicle behavior estimation device 100 further includes a signal setting data storage unit 2901, a signal model calculation unit 2902, a signal state data storage unit 2903, and a behavior parameter correction unit 2904.

The signal setting data storage unit 2901 stores signal setting data relating to order of lighting and flashing traffic signals and the durations.

The signal model calculation unit 2902 calculates signal state data relating to lighting and flashing signals based on the signal setting data stored in the signal setting data storage unit 2901.

The signal state data storage unit 2903 stores signal state data that is output from the signal model calculation unit 2902.

FIG. 30 illustrates an example of a signal setting data table stored in the signal setting data storage unit 2901.

A signal setting data table 3000 includes columns of setting ID, a state, and duration.

The setting ID column stores setting IDs that correspond to a combination pattern of order of lighting and flashing signals and the duration.

The state column stores state information of a combination of display directions of traffic signals and display colors. In the example, a general intersection where two roads intersect, red, yellow, or green is turned on substantially the same timing for opposing lanes. A traffic signal on one side of the lane is referred to as an "a" side, whereas a traffic signal on the other side of the lane is referred to as a "b" side.

The duration column stores duration of state that is stored in the state column.

FIG. 30 illustrates combinations of lighting of red, green, and yellow and the duration. Moreover, flashing the signals may be treated as state information and the combination may be stored together with the duration. Furthermore, when an intersection includes a signal for right-turn only, a signal for going straight only, and a signal for left-turn only, information of the signals may be stored as state information. Moreover, when an intersection is junction of three streets, and the intersection has five or more directions, setting patterns for each combination of display directions are stored together with the duration. When an intersection includes a signal for pedestrians, the display state of signal for vehicles and signal for pedestrians, combination of the display directions and the duration are stored as setting pattern.

The signal model calculation unit 2902 refers to the signal setting data table of the signal setting data storage unit 2901 based on the setting ID of each signal installed at an intersection and determines the display state of each signal for each direction and stores the determined states in the signal state data storage unit 2903.

FIG. 31 illustrates an example of a signal state data table stored in the signal state data storage unit 2903.

A signal state data table 3100 includes columns of a signal ID, a state, an update time, and settings.

The signal ID column stores an identification symbol that is set for each signal.

The state column stores a state of a signal calculated by the signal model calculation unit 2902.

The update time column stores time information updated by the signal model calculation unit 2902.

The setting column stores setting ID set for a signal corresponds to the signal ID, and display direction information.

The signal model calculation unit 2902 determines state of lighting and flashing for each display direction based on the setting ID set for the signal and stores the determined result in the signal state data storage unit 2903 together with the update time.

The behavior parameter correction unit 2904 corrects behavior parameters calculated by the behavior parameter calculation unit 101 based on the signal state data stored in the signal state data storage unit 2903.

For example, the behavior parameter correction unit 2904 assumes that using behavior parameters calculated by the behavior parameter calculation unit 101 makes a vehicle stop by a red signal at a signalized intersection located ahead and thereby the vehicle may not reach an observation point at a next passing time. In this case, the behavior parameter correction unit 2904 corrects the behavior parameters so as to increase the target speed and the target acceleration. Moreover, the behavior parameter correction unit 2904 assumes that using behavior parameters calculated by the behavior parameter calculation unit 101 makes the vehicle pass by a green signal at the signalized intersection located ahead and go beyond the observation point at the next passing time even when the target acceleration is set to a substantially maximum deceleration. In this case, the behavior parameter correction unit 2904 corrects the behavior parameters so as to reduce the target speed and the target acceleration.

Hereinafter, the above-described correction of behavior parameters will be described.

Figure 32:
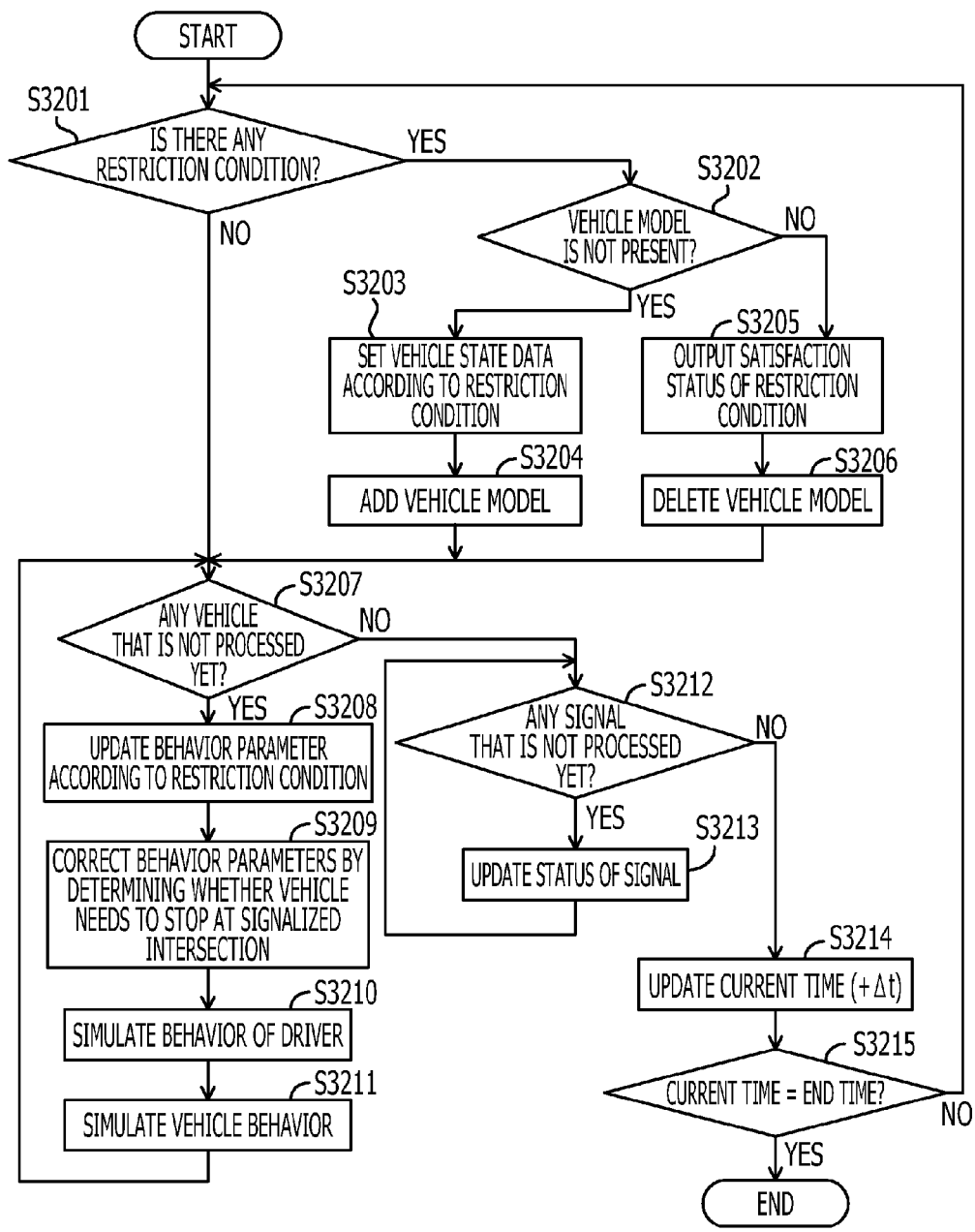
FIG. 32 is a flow chart of a vehicle behavior estimation device according to one embodiment.

FIG. 32 is a flow chart of a vehicle behavior estimation device 100 according to one embodiment.

At Operation S3201, the vehicle behavior estimation device 100 determines whether there is any restriction condition having passing time that matches the time when simulation is calculated.

The simulation control unit 103 searches for restriction conditions stored in the restriction condition storage unit 110 and if there is any restriction condition having passing time that matches the time when simulation is calculated, the process proceeds to Operation S3202, and otherwise proceeds to Operation S3207.

At Operation S3202, the vehicle behavior estimation device 100 determines whether there is any vehicle model corresponds to the restriction condition having passing time that matches the time when simulation is calculated.

The simulation control unit 103 determines whether the restriction condition corresponds to a vehicle model controlled by the vehicle model calculation unit 102 and if the restriction condition does not correspond to the vehicle model, the process proceeds to Operation S3203, and the restriction condition corresponds to the vehicle model, the process proceeds to Operation S3205.

At Operation S3203, the vehicle behavior estimation device 100 sets vehicle state data based on the restriction conditions. The vehicle model calculation unit 102 sets vehicle state data of a vehicle model that is newly provided based on the restriction conditions obtained from the restriction condition storage unit 110. When restriction conditions stored in the restriction condition storage unit 110 include driving speed information when the vehicle passes an observation point, the position information and the driving speed information of the observation point are set as initial values.

At Operation S3204, the vehicle behavior estimation device 100 adds a new vehicle model. The vehicle model calculation unit 102 adds a new vehicle model the initial values of which satisfy the restriction conditions obtained from the restriction condition storage unit 110.

At Operation S3207, the vehicle behavior estimation device 100 determines whether there is any vehicle for which processing is not applied yet among vehicles for which simulation are to be applied.

Here, the vehicle behavior estimation device 100 determines whether vehicle state data when simulation is calculated is updated for the vehicle models controlled by the vehicle model calculation unit 102. As a result of determination, if there is any vehicle model to which the processing is not applied yet, the process proceeds to Operation S3208, and if processing is applied to all of the vehicle models, the process proceeds to Operation S3212.

At Operation S3208, the vehicle behavior estimation device 100 updates behavior parameters based on the restriction conditions. The behavior parameter calculation unit 101 calculates a target speed and target acceleration from restriction conditions stored in the restriction condition storage unit 110 and vehicle state data at the time of calculation, and stores the calculated results in the behavior parameter storage unit 111 as behavior parameters.

At Operation S3209, the vehicle behavior estimation device 100 determines whether the vehicle stops at a signalized intersection and corrects the behavior parameters.

The behavior parameter correction unit 2904 refers to signal state data stored in the signal state data storage unit 2903 and obtains signal state data of a signalized intersection located ahead of the driving direction. The behavior parameter correction unit 2904 determines if there is any signal state data that may not satisfy the restriction conditions when behavior parameters calculated by the behavior parameter calculation unit 101 are used. For example a case is assumed in which using the behavior parameters calculated by the behavior parameter calculation unit 101 makes a vehicle stop by a red signal at a signalized intersection located ahead and the vehicle may not reach an observation point at the next passing time. In this case, the behavior parameter correction unit 2904 corrects the behavior parameters so as to increase the target speed and target acceleration. Moreover, a case is assumed in which using the behavior parameters calculated by the behavior parameter calculation unit 101 makes a vehicle pass the signalized intersection located ahead by a green signal and the vehicle goes beyond the observation point at the next passing time even if the target acceleration is set to substantially maximum deceleration. In this case, the behavior parameter correction unit 2904 corrects the behavior parameters so as to reduce the target speed and target acceleration.

At Operation S3210, the vehicle behavior estimation device 100 simulates driving behavior of the driver of the vehicle. Here, the driver model calculation unit 105 simulates driving behavior of the driver based, for example, on surrounding traffic environment information. The driver model calculation unit 105 calculates driving behavior such as a steering operation amount, and an accelerator and brake pedal operation amount based, at least, on the target speed and target acceleration calculated by the behavior parameter storage unit 111.

The driver model calculation unit 105 may use signal state data stored in the signal state data storage unit 2903 as surrounding traffic environment information and may calculate driving behavior according to a state of a signal located ahead of the driving direction.

At Operation S3211, the vehicle behavior estimation device 100 simulates vehicle behavior. Here, the vehicle body movement model calculation unit 106 simulates movement behavior of the vehicle body based on the movement behavior calculated by the driver model calculation unit 105 and calculates vehicle state data based, for example, on steering operation amount, an accelerator and brake pedal operation amount.

The vehicle behavior estimation device 100 proceeds to Operation S3207 and updates vehicle state data for all of the vehicle models.

At Operation S3212, the vehicle behavior estimation device 100 determines whether there is any signal for which signal state data is not updated. The signal model calculation unit 2902 calculates states of lighting and flashing of each signal based on signal setting data stored in the signal setting data storage unit 2901. The signal model calculation unit 2902 determines if there is any signal ID that signal state data when simulation is calculated is not updated among signal state data stored in the signal state data storage unit 2903. If there is any signal ID that signal state data when simulation is calculated is not updated yet, the process proceeds to Operation S3213 and if updating signal state data for all of the signals is completed, the proceeds to Operation S3214.

At Operation S3213, the vehicle behavior estimation device 100 updates signal state data. The signal model calculation unit 2902 determines signal state data at the time of calculation based on setting information stored in the signal setting data storage unit 2901 for signals that are subject to the calculation. The signal model calculation unit 2902 updates signal state data stored in the signal state data storage unit 2903 based on the signal state data at the time of calculation.

At Operation S3214, the vehicle behavior estimation device 100 updates time when simulation is calculated. The simulation control unit 103 increments the time when simulation is calculated for certain time Δt.

At Operation S3215, the vehicle behavior estimation device 100 determines whether time when simulation is calculated is end time. The simulation control unit 103 ends the processing if the simulation control unit 103 determines time when simulation is calculated is end time, and otherwise proceeds to Operation S3201.

At Operation S3205, the vehicle behavior estimation device 100 determines how much vehicle state data at the time of calculating the vehicle model satisfies the restriction conditions and outputs the determination result.

At Operation S3206, the vehicle behavior estimation device 100 updates the vehicle model. The vehicle model calculation unit 102 deletes a vehicle model corresponding to restriction conditions having passing time that matches time when simulation is calculated and proceeds to Operation S3207.

Figure 33:
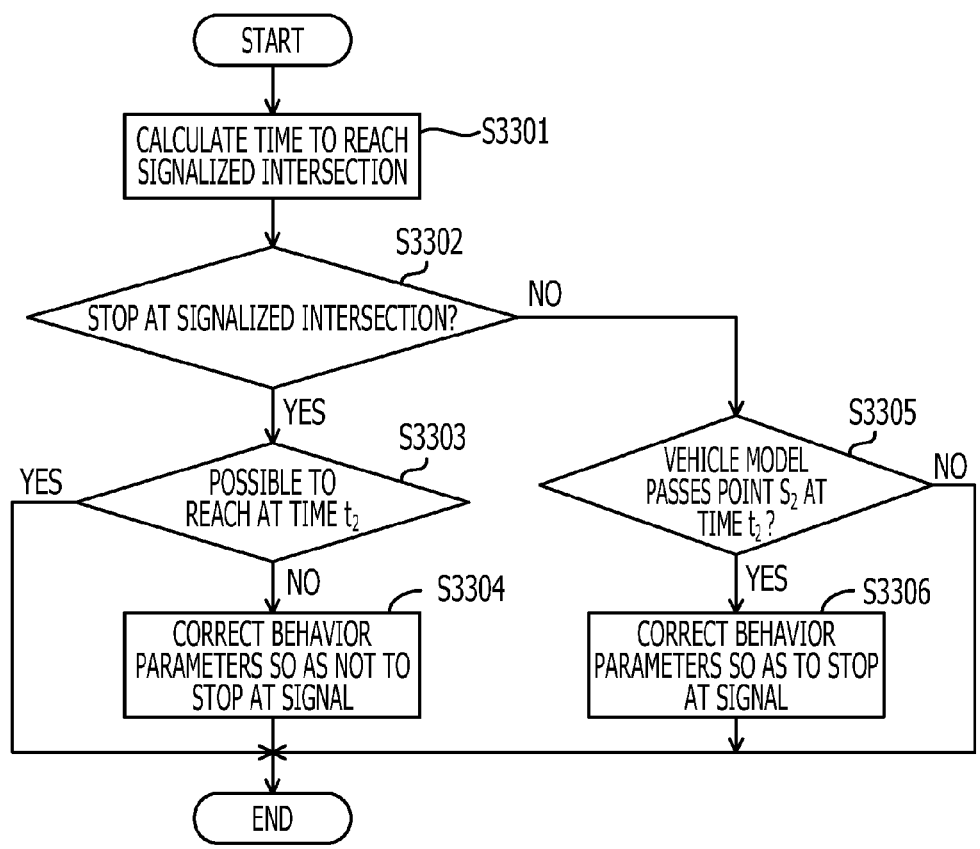
FIG. 33 is a flow chart of a vehicle behavior estimation device according to one embodiment.

FIG. 33 is a flow chart illustrating an example of correction processing of behavior parameters.

At Operation S3301, the vehicle behavior estimation device 100 calculates time to reach a signalized intersection. The behavior parameter correction unit 2904 calculates time when a vehicle model reaches a signalized intersection positioned ahead of the driving direction when the vehicle model travels based on behavior parameters calculated by the behavior parameter calculation unit 101.

At Operation S3302, the vehicle behavior estimation device 100 determines whether the vehicle model stops at the signalized intersection. The behavior parameter correction unit 2904 refers to signal state data stored in the signal state data storage unit 2903 and signal setting data stored in the signal setting data storage unit 2901. The behavior parameter correction unit 2904 checks a state of a relevant signal at reach time when the vehicle model reaches the signalized intersection calculated by Operation S3301. As a result, the behavior parameter correction unit 2904 proceeds to Operation S3302 when the behavior parameter correction unit 2904 determines the vehicle stops at the signalized intersection when the vehicle travels by behavior parameters at the time of calculation and otherwise, proceeds to Operation S3305.

At Operation S3303, the vehicle behavior estimation device 100 determines whether the vehicle reaches the observation point $s_2$ at the next passing time $t_2$. The behavior parameter correction unit 2904 determines whether the vehicle reaches the observation point $s_2$ at the next passing time $t_2$ after stopping at the signalized intersection and travels to the next observation point $s_2$ with target acceleration within the substantially maximum acceleration $a_{max}$. The behavior parameter correction unit 2904 ends the processing when the behavior parameter correction unit 2904 determines the vehicle reaches the observation point $s_2$ and otherwise proceeds to Operation S3304.

At Operation 3304, the vehicle behavior estimation device 100 corrects behavior parameters so that the vehicle model does not stop at the signalized intersection. The behavior parameter correction unit 2904 increases the target speed and target acceleration so that the vehicle model passes the signalized intersection before the signal located ahead of driving direction of the vehicle model turns red.

Figure 34:
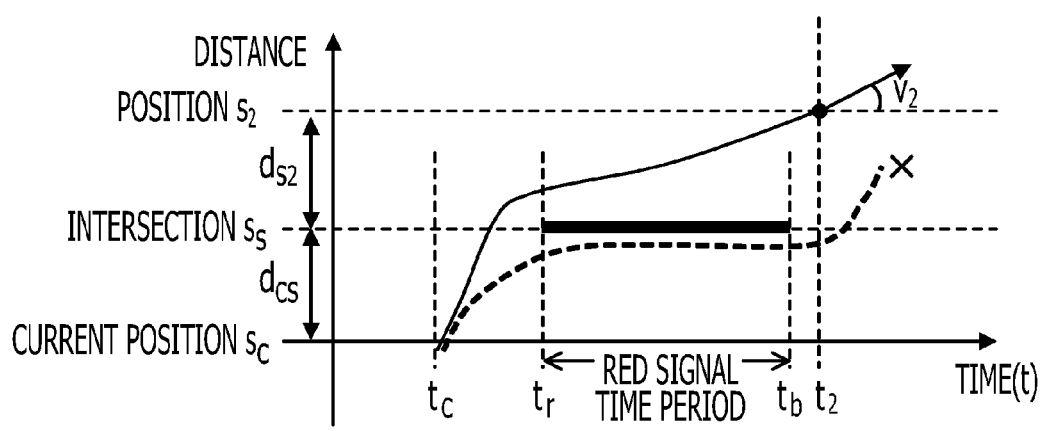
FIG. 34 illustrates a relationship between time and position of a vehicle model.
Figure 35:
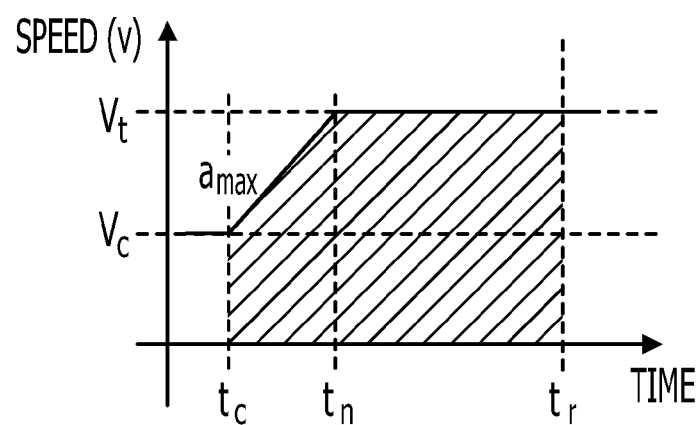
FIG. 35 illustrates a relationship between time and position of a vehicle model.

FIGS. 34 and 35 illustrates correcting behavior parameters so that the vehicle does not stop at the signalized intersection.

In FIGS. 34 and 35, a position of a vehicle model when calculation is started at time $t_c$ is $s_c$, a reach position at the next passing time $t_2$ is an observation point $s_2$ which is restriction condition, and a position of a signalized intersection is $s_s$. A distance from the position $s_c$ at the start of calculation to the position of the signalized intersection $s_s$ is $d_{cs}$. A distance from the signalized intersection $s_s$ to the observation point $s_2$ is $d_{s2}$.

Time when a signal display for the vehicle model at the signalized intersection turns red is time $t_r$. Time when the signal subsequently turns green is $t_b$.

A case is assumed in which the behavior parameter correction unit 2904 determines the vehicle model passes the signalized intersection $s_s$ later than time $t_r$ when the signal display turns red if the vehicle model travels with the behavior parameters at the time of calculation. In this case, the behavior parameter correction unit 2904 determines whether the vehicle model reaches the observation point $s_2$ between time $t_b$ when the signal subsequently turns green and the next passing time $t_2$. A condition in which the vehicle is determined not to reach the observation point $s_2$ at time between time $t_b$ when the signal subsequently turns green and the next passing time $t_2$ is one of the following conditions.

$$d_{s2}/(t_2-t_b) > a_{max} \tag{16}$$

$$t_b > t_2 \tag{17}$$

The expression (16) indicates a case in which the vehicle model may not reach the observation point $s_2$ from the signalized intersection $s_s$ even if the vehicle model travels with target acceleration of substantially the maximum acceleration $a_{max}$ time $t_b$ when the signal subsequently turns green.

The expression (17) indicates a case in which time when the signal turns green $t_b$ is later than the passing time $t_2$.

In this case, the behavior parameter correction unit 2904 corrects the target acceleration $a_t$ and the target speed $v_t$ to increase the speed within a range that complies with traffic rules so that the vehicle model passes the signalized intersection $s_s$ before time $t_r$ when signal turns red at the signalized intersection $s_s$. The behavior parameter correction unit 2904 may set target acceleration $a_t$ to substantially the maximum acceleration $a_{max}$ and set target speed $v_t$ to a speed calculated by the following expression.

$$t_n = t_c + (v_t - v_c)/a_t \text{ (where } t_n < t_r) \tag{18}$$

$$(t_r - t_n)v_t + (v_c + v_t)(t_n - t_c)/2 = d_{cs} + a \tag{19}$$

Here, time when the speed reaches the target speed $v_t$ is reach time $t_n$ and the reach time $t_n$ is assumed to be before time $t_r$ when the signal turns red at the signalized intersection.

As represented by the expression (19), the behavior parameter correction unit 2904 assumes time when the vehicle reaches the target speed $v_t$ if the vehicle model is accelerated with substantially the maximum acceleration $a_{max}$ as the reach time $t_n$. Moreover, the behavior parameter correction unit 2904 determines a target speed $v_t$ so that the vehicle travels a distance greater than the distance $d_{cs}$ that is from the position $s_c$ when calculation is started to the position of the intersection $s_s$. This is achieved by accelerating the vehicle model with substantially the maximum acceleration $a_{max}$ from time $t_c$ at the start of calculation to reach time $t_n$ and by maintaining the target speed $v_t$ until time when the signal turns red $t_r$.

When there is a sufficient time difference between the reach time $t_n$ when the vehicle reaches target speed $v_t$ and time when the signal turns red $t_r$, "α" in the expression (19) may be 0 and may be set as appropriate based on a relationship between the target speed and the target acceleration after passing the signalized intersection.

For example, as illustrated in FIG. 35, the behavior parameter correction unit 2904 sets the target acceleration $a_t$ from the time $t_c$ when calculation is started to the reach time $t_n$ to substantially the maximum acceleration $a_{max}$. The behavior parameter correction unit 2904 maintains the speed after the vehicle model reaches the target speed $v_t$ until time $t_r$ when the signal turns red. As a result, a travel distance from time $t_c$ at the start of calculation to time $t_r$ when signal turns red exceeds the distance $d_{cs}$ that is from the position $s_c$ at the start of calculation to the position of the intersection $s_s$. Accordingly, an area obtained by integrating the speed in FIG. 35 is $d_{cs}$ or more.

At Operation S3305, the vehicle behavior estimation device 100 determines whether the vehicle model passes the observation point $s_2$ at the next passing time $t_2$. The behavior parameter correction unit 2904 determines whether a speed from the signalized intersection to the next observation point $s_2$ is below the lower speed limit $v_{min}$ when the vehicle model passes the signalized intersection without stopping. The behavior parameter correction unit 2904 proceeds to Operation S3306 when the behavior parameter correction unit 2904 determines the speed is below the lower speed limit $v_{min}$ and otherwise, behavior parameter correction unit 2904 ends the processing.

At Operation S3306, the vehicle behavior estimation device 100 corrects behavior parameters so that the vehicle model stops at the signalized intersection. The behavior parameter correction unit 2904 decreases the target speed and the target acceleration of the behavior parameters so that the vehicle model reaches the signalized intersection after the signal located ahead of the driving direction turns red.

Figure 36:
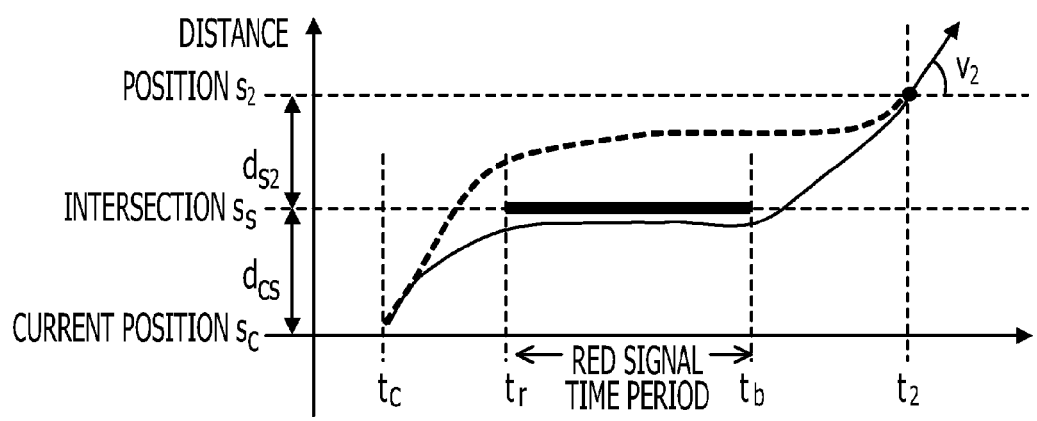
FIG. 36 illustrates a relationship between time and position of a vehicle model.
Figure 37:
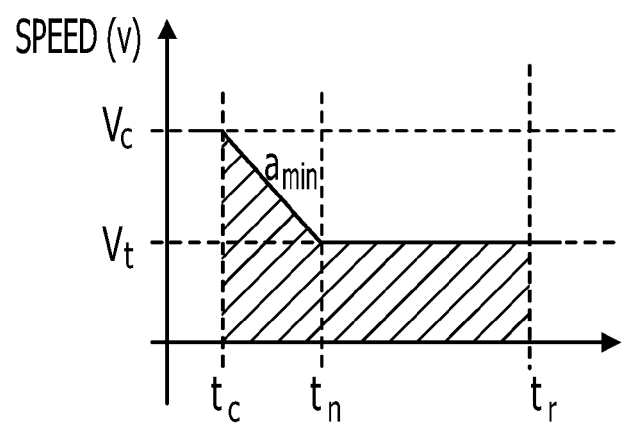
FIG. 37 illustrates a relationship between time and position of a vehicle model.

FIGS. 36 and 37 illustrate correcting behavior parameters so that a vehicle model stops at a signalized intersection.

In FIGS. 36 and 37, a position of a vehicle model when calculation is started at time $t_c$ is $s_c$, a reach position at the next passing time $t_2$ is an observation point $s_2$ which is a restriction condition, and a position of a signalized intersection is $s_s$. A distance from the position $s_c$ at the start of calculation to the position of the signalized intersection $s_s$ is $d_{cs}$. A distance from the signalized intersection $s_s$ to the observation point $s_2$ is $d_{s2}$.

Time when a signal display for the vehicle model at the signalized intersection turns red is time $t_r$. Time when the signal subsequently turns green is $t_b$.

In this case, the behavior parameter correction unit 2904 determines whether the vehicle passes the observation point $s_2$ at the next passing time $t_2$ when the behavior parameter correction unit 2904 determines the vehicle model reaches the signalized intersection $s_s$ earlier than time $t_r$ when the signal turns red if the vehicle model travels with the behavior parameters at the time of calculation. For example, the behavior parameter correction unit 2904 corrects the target acceleration and the target speed when the behavior parameter correction unit 2904 determines the target speed $v_t$ is below the lower speed limit $v_{min}$ in order to make the vehicle pass the observation point $s_2$ at the next passing time $t_2$. An example of a condition in which the behavior parameter correction unit 2904 determines the target speed $v_t$ is below the lower speed limit $v_{min}$ is as follows.

$$d_{s2}/(t_2-t_r) < V_{min} \tag{20}$$

In this case, the behavior parameter correction unit 2904 corrects the target acceleration $a_t$ and the target speed $v_t$ so that the vehicle reaches the signalized intersection $s_s$ later than time $t_r$ when the signal at the signalized intersection turns red. The behavior parameter correction unit 2904 may set target acceleration $a_t$ to substantially the maximum deceleration $a_{min}$ and set target speed $v_t$ to a speed calculated by the following expressions.

$$t_n = t_c + (v_t - v_c)/a_t \text{ (where } t_n < t_r) \tag{21}$$

$$(t_r - t_n)v_t + (v_c + v_t)-t_c)/2 = d_{cs} - \beta \tag{22}$$

Here, time when the speed reaches the target speed $v_t$ is reach time $t_n$.

As represented by the expression (21), the behavior parameter correction unit 2904 assumes time when the vehicle model reaches the target speed $v_t$ when the vehicle model is decelerated with substantially the maximum deceleration $a_{min}$ as the reach time $t_n$. Moreover, the behavior parameter correction unit 2904 determines a target speed $v_t$ so that the vehicle travels a distance that does not exceed the distance $d_{cs}$ from the position $s_c$ when calculation is started to the position of the intersection $s_s$ before the signal turns red $t_r$. This is achieved by decelerating the vehicle model with substantially the maximum deceleration $a_{min}$ from time $t_c$ when calculation is started to reach time $t_n$ and by maintaining the target speed $v_t$ until time when the signal turns red $t_r$.

When there is a sufficient time difference between the reach time $t_n$ when the vehicle model reaches the target speed $v_t$ and time when the signal turns red, "β" in the expression (21) may be 0 or may be set as appropriate.

For example, as illustrated in FIG. 37, the behavior parameter correction unit 2904 sets the target acceleration $a_t$ from the time $t_c$ when calculation is started to the reach time $t_n$ to substantially the maximum deceleration $a_{min}$. The behavior parameter correction unit 2904 maintains the speed after the vehicle reaches the target speed $v_t$ until time $t_r$ when the signal turns red. As a result, a travel distance from time $t_c$ at the start of calculation to time $t_r$ when the signal turns red is equal to or less than the distance $d_{cs}$ from the position $s_c$ at the start of calculation to the position of the intersection $s_s$. Accordingly, an area obtained by integrating the speed in FIG. 35 is $d_{cs}$ or less.

Note that the behavior parameter correction unit 2904 may allow the speed to be the lower speed limit $v_{min}$ or less, for example, when traffic congestion occurs ahead of the signalized intersection, and may not correct behavior parameters at the time of calculation. Density of surrounding vehicle models may be used as a condition to determine an occurrence of traffic congestion when the next passing speed $v_2$ is equal to or less than a threshold.

According to the above-described embodiment, a vehicle model is controlled so as to satisfy the restriction conditions by correcting behavior parameters before and after the signalized intersection when the restriction conditions are not satisfied depending on a state of a signal. The behavior parameter correction unit 2904 may correct behavior parameters based on information such as opening and closing of a railway crossing, vehicles coming from an intersection without any signal, a state of pedestrians at an intersection, disabled vehicles on a road, and accident information in addition to the signal state data.

The above-described embodiment visualizes and analyzes traffic conditions and provides traffic information, for example, to alleviate traffic congestion and to estimate an amount of $CO_2$ emission.

Figure 40:
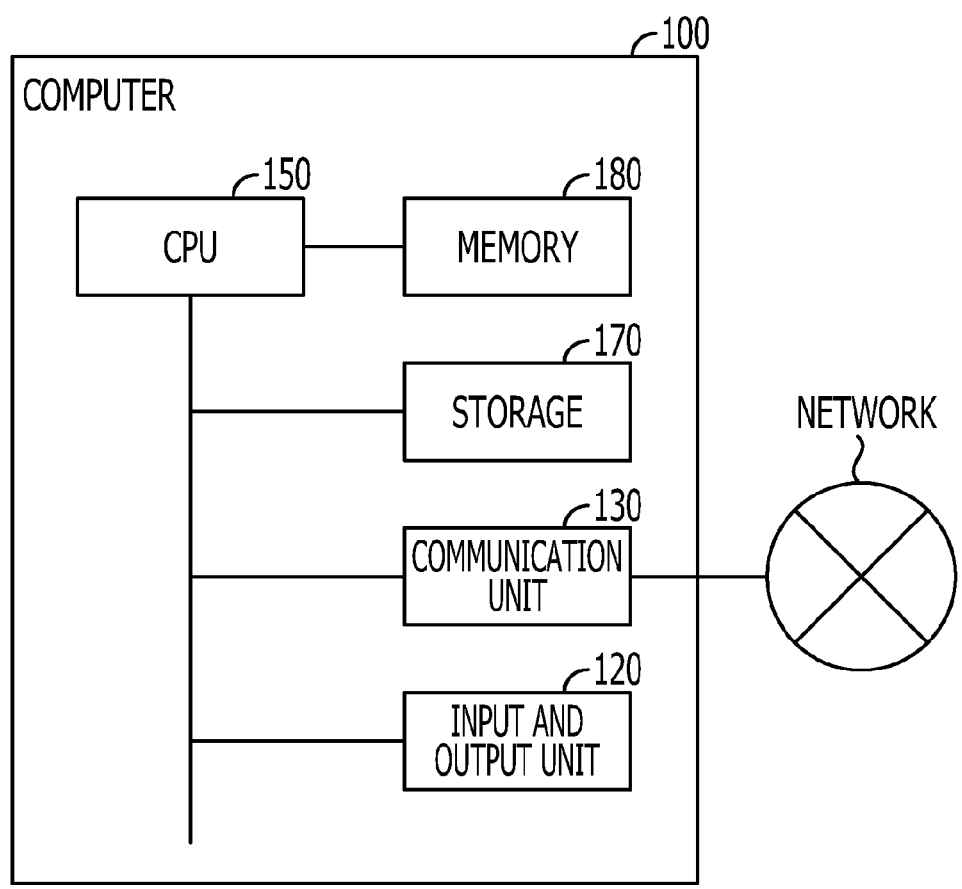
FIG. 40 illustrates a computer that executes a vehicle behavior estimation program stored in a non-transitory computer-readable storage medium.

The above-described vehicle behavior estimation device 100 may be provided by a non-transitory computer-readable storage medium storing a vehicle behavior estimation program that is executed by a computer. FIG. 40 illustrates a computer that executes a vehicle behavior estimation program stored in a non-transitory computer readable storage medium.

A computer 100 includes a Central Processing Unit (CPU) 150, a memory 180, storage 170, a communication unit 130, and an input and output unit 110.

The storage 170 is a hard disk drive (HDD) or a Solid State Drive (SSD) and may be a drive that reads a portable storage medium. The storage 170 stores a vehicle behavior estimation program. The memory 180 is a storage device such as a dynamic access random access memory (DRAM) that provides a faster access than the storage 170.

The CPU 150 reads the vehicle behavior estimation program from the storage 170, writes to the memory 180, and executes the read program.

The communication unit 130 is a network interface connected to the Internet or a wireless communication network. The communication unit 130 may be used to collect observation data of a vehicle detected by a sensor. The communication unit 130 may be used to read the vehicle behavior estimation program.

The input and output unit 120 is a video adapter that connects a display or an input interface that connects a keyboard or a mouse.

The vehicle behavior estimation program is not necessarily stored in the HDD 170 initially. For example, the vehicle behavior estimation program may be stored in a "portable physical medium" readable by the computer 100 such as a floppy disk (FD), a compact disc read only memory (CD-ROM), a digital versatile disc read only memory (DVD-ROM), a Blu-ray Disc read only memory (BD-ROM), an optical magnetic disk, a flash memory card, and a USB memory. The computer 100 may obtain the vehicle behavior estimation program from the above-described portable physical medium and execute the obtained program.

Moreover, the program may be stored in a physical medium in another computer or a server device. The computer 100 may obtain the program from physical medium in another computer or a server device through digital communication broadcasting using broadcast wave, a public network, the Internet, a local area network (LAN), and a wide area network (WAN.)

The computer-readable storage medium that stores the program is a physical medium. The computer-readable storage medium that stores the program does not include a carrier wave to which the computer program is embedded.

The computer-readable storage medium is a storage medium that is physically present because a computer readable storage medium that is included in a transmission source computer is present even when a computer program is transmitted by being embedded in a carrier wave.

The broadcasting wave may be transmitted by using terrestrial, satellite broadcasting wave, and a cable television transmission network. The cable television may modulate a carrier wave into light and use an optical fiber as a transmission medium. The computer readable storage medium is a physically present storage medium regardless of a form of the transmission medium of the carrier wave.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A vehicle behavior estimation device comprising:
a memory configured to store:
a first restriction condition at a first point, the first restriction condition including a position, a time, and a speed at the first point of a vehicle;
a second restriction condition at a second point different from the first point, the second restriction condition including a position, a time and a speed at the second point of the vehicle; and physical restriction conditions that include at least an upper limit and a lower limit of a target acceleration of the vehicle; and
a processor coupled to the memory and configured to:
store a vehicle model including a target speed and the target acceleration, generated based on the first restriction condition and the second restriction condition, in the memory when a restriction condition that is stored in the memory includes a passing time that matches with time when a simulation of the vehicle is conducted;
obtain vehicle state data including at least position data and speed data of the vehicle at a predetermined time interval;
determine whether the vehicle model corresponding to the obtained vehicle state data exists in the memory, every time when the vehicle state data are obtained:
calculate the target speed and the target acceleration, based on the obtained vehicle state data and the second restriction condition, when it is determined that the vehicle model corresponding to the obtained vehicle state data does not exist in the memory;
store a new vehicle model including the calculated target speed and the calculated target acceleration in the memory; and
repeat processing to calculate the behavior parameters target speed and the target acceleration by using the updated vehicle state data and the second restriction condition, the target speed and the target acceleration satisfying the physical restriction conditions, the first restriction condition, and the second restriction condition and to update the updated vehicle state data, at the predetermined time interval until the vehicle moves from the first point to the second point.

2. The vehicle behavior estimation device according to claim 1;
wherein the processor calculates driving behavior including an operation amount of a driver based on the behavior parameters; and updates the vehicle state data based on the behavior parameters and the driving behavior.

3. The vehicle behavior estimation device according to claim 1;
wherein the processor is configured to allow an error of speed information more than errors of other information in the second restriction condition.

4. The vehicle behavior estimation device according to claim 3;
wherein, the first restriction condition and the second restriction condition are generated from information collected by a group of sensors installed along a road, the position at the first point and the second point are generated based on identification information that identifies a sensor, and the time at the first point and the second point are generated based on time when information is output from the sensor, and the speed at the first point and the second point are generated based on speed information output by the sensor.

5. The vehicle behavior estimation device according to claim 1;
wherein the processor is configured to:
calculate a distance based on position information included in the vehicle state data and the position at the second point included in the second restriction condition; and
calculate the target acceleration and target speed so that an integrated value of speed information included in the vehicle state data becomes close to the distance.

6. The vehicle behavior estimation device according to claim 1;
wherein the first restriction condition and the second restriction condition include lane information that identifies a lane in a road with a plurality of lanes, and the processor is configured to calculate target lane information calculated as one of the behavior parameters based on the lane information.

7. The vehicle behavior estimation device according to claim 1, wherein the processor is further configured to:
calculate an error between a passing time and a passing speed when the vehicle passes the second point and the time and the speed of the second restriction condition stored in the memory; and
output an alarm when the error exceed thresholds.

8. The vehicle behavior estimation device according to claim 1, wherein the processor is further configured to:
obtain observation data of a plurality of another vehicles at the predetermined time interval, the observation data including at least position data and speed data of the plurality of another vehicles;
calculate a distance between the vehicle and a front vehicle traveling in front of the vehicle among the plurality of another vehicles, based on the vehicle state data of the vehicle and the observation data of the front vehicle; and
calculate the target speed and the target acceleration for the vehicle based on the distance.

9. A non-transitory computer-readable storage medium storing a program executed by a computer that stores a first restriction condition at a first point, the first restriction condition including a time and a speed at the first point of a vehicle, a second restriction condition at a second point different from the first point, the second restriction condition including a time and a speed at the second point of the vehicle, physical restriction conditions that include at least an upper limit and a lower limit of a target acceleration of the vehicle, and a vehicle model including a target speed and the target acceleration, generated based on the first restriction condition and the second restriction condition, in a memory, the program causes the computer to execute a process comprising:
storing a vehicle model including a target speed and the target acceleration, generated based on the first restriction condition and the second restriction condition, in the memory when a restriction condition that is stored in the memory includes a passing time that matches with time when a simulation of the vehicle is conducted;
obtaining vehicle state data including at least position data and speed data of the vehicle at a predetermined time interval;
determining whether the vehicle model corresponding to the obtained vehicle state data exists in the memory, every time when the vehicle state data are obtained;
calculating, with the computer, the target speed and the target acceleration, based on the obtained vehicle state data and the second restriction condition, when it is determined that the vehicle model corresponding to the obtained vehicle state data does not exist in the memory;
storing a new vehicle model including the calculated target speed and the calculated target acceleration in the memory; and
repeating calculating the target speed and the target acceleration using the updated vehicle state data and the second restriction condition, the target speed and the target acceleration satisfying the physical restriction conditions, the first restriction condition, and the second restriction condition, and updating the updated vehicle state data, at the predetermined time interval until the vehicle moves from the first point to the second point.

10. A method to estimate vehicle behavior with a computer, the method comprising:
storing a first restriction condition at a first point, the first restriction condition including a time and a speed at the first point of a vehicle, a second restriction condition at a second point different from the first point, the second restriction condition including a time and a speed at the second point of the vehicle, physical restriction conditions that include at least an upper limit and a lower limit of a target acceleration of the vehicle, the target acceleration satisfying the second restriction condition, in a memory;
storing a vehicle model including a target speed and the target acceleration, generated based on the first restriction condition and the second restriction condition, in the memory when a restriction condition that is stored in the memory includes a passing time that matches with time when a simulation of the vehicle is conducted:
obtaining vehicle state data including at least position data and speed data of the vehicle at a predetermined time interval;
determining whether the vehicle model corresponding to the obtained vehicle state data exists in the memory, every time when the vehicle state data are obtained;
calculating, with the computer, the target speed and the target acceleration, based on the obtained vehicle state data and the second restriction condition, when it is determined that the vehicle model corresponding to the obtained vehicle state data does not exist in the memory;
storing a new vehicle model including the calculated target speed and the calculated target acceleration in the memory; and
repeating calculating the target speed and the target acceleration using the updated vehicle state data and the second restriction condition, the target speed and the target acceleration satisfying the physical restriction conditions, the first restriction condition, and the second restriction condition, and updating the updated vehicle state data, at the predetermined time interval until the vehicle moves from the first point to the second point.

11. The vehicle behavior estimation device according to claim 1, wherein the physical restriction conditions further include an upper limit and a lower limit of the target speed, the higher limit being higher than the target speed, and the lower limit being lower than the target speed.

12. The vehicle behavior estimation device according to claim 1, wherein the processor is configured to calculate the target acceleration so that the target acceleration is within a range between the upper limit of the target acceleration and the lower limit of the target acceleration.

13. The vehicle behavior estimation device according to claim 1, wherein the updated vehicle state data is a simulation result at a point between the first point and the second point.

14. The vehicle behavior estimation device according to claim 8,
wherein the processor is further configured to correct the calculated speed and the calculated target acceleration based on at least one of state information of a signal, a railway crossing, and a pedestrian crossing.

15. The vehicle behavior estimation device according to claim 1, wherein the processor is configured to:
determine how much the obtained vehicle state data satisfies the first restriction condition and the second restriction condition, when it is determined that the vehicle model corresponding to the obtained vehicle state data exists in the memory;
output a result of the determination; and
delete the vehicle model.

16. The vehicle behavior estimation device according to claim 14, wherein the processor is configured to:
determine whether the vehicle can reach to the second point by the time at the second point by using the updated target speed and the updated target acceleration, based on signal state information including an identifier of a signal, a display color, and an update time of the display color; and correct the calculated speed and the calculated target acceleration, when it is determined that the vehicle cannot reach to the second point at the passing time of the second point.

* * * * *